(12) United States Patent
Neily et al.

(10) Patent No.: US 6,819,438 B2
(45) Date of Patent: *Nov. 16, 2004

(54) TECHNIQUE FOR FABRICATING HIGH QUALITY OPTICAL COMPONENTS

(75) Inventors: Richard A. Neily, Kars (CA); William McCreath, Stittsville (CA); David Parker, Morewood (CA)

(73) Assignee: GSI Lumonics Corporation, Billerica, MA (US)

( * ) Notice: Subject to any disclaimer, the term of this patent is extended or adjusted under 35 U.S.C. 154(b) by 208 days.

This patent is subject to a terminal disclaimer.

(21) Appl. No.: 10/137,662

(22) Filed: May 3, 2002

(65) Prior Publication Data

US 2002/0176098 A1 Nov. 28, 2002

Related U.S. Application Data

(63) Continuation-in-part of application No. 09/872,303, filed on Jun. 1, 2001, now Pat. No. 6,639,682.
(60) Provisional application No. 60/208,863, filed on Jun. 2, 2000.

(51) Int. Cl.$^7$ .............................................. G01B 11/06
(52) U.S. Cl. ...................................... 356/632; 356/485
(58) Field of Search ................ 356/237.1, 237.2–237.5, 356/485, 503–505, 630–632, 429–430; 250/559.27

(56) References Cited

U.S. PATENT DOCUMENTS

| | | | |
|---|---|---|---|
| 5,327,220 A | 7/1994 | Erickson | |
| 5,528,370 A | 6/1996 | Tracy et al. | |
| 5,620,357 A | 4/1997 | Misaka et al. | |
| 5,671,050 A | 9/1997 | de Groot | |
| 5,724,137 A | 3/1998 | Tronolone et al. | |
| 5,751,427 A | 5/1998 | de Groot | |
| 5,923,425 A | 7/1999 | Dewa et al. | |
| 6,048,742 A | 4/2000 | Weyburne et al. | |
| 6,198,293 B1 | 3/2001 | Woskov et al. | |
| 6,639,682 B2 * | 10/2003 | Neily et al. | 356/504 |

* cited by examiner

Primary Examiner—Richard A. Rosenberger
Assistant Examiner—Vincent P. Barth
(74) Attorney, Agent, or Firm—Maine & Asmus

(57) ABSTRACT

To determine the uniformity of an optical component, a light beam is directed to impinge on a surface of an optical component at each of multiple points. A characteristic of the light beam impinging on the optical component surface at each of the multiple points is modified so as to have multiple different values. Light from the impinging light beam that passes through the optical component at each of the multiple points, with the light beam characteristic at each of the multiple different values, is detected. The non-uniformity of the optical component is determined based on the detected passing light.

41 Claims, 7 Drawing Sheets

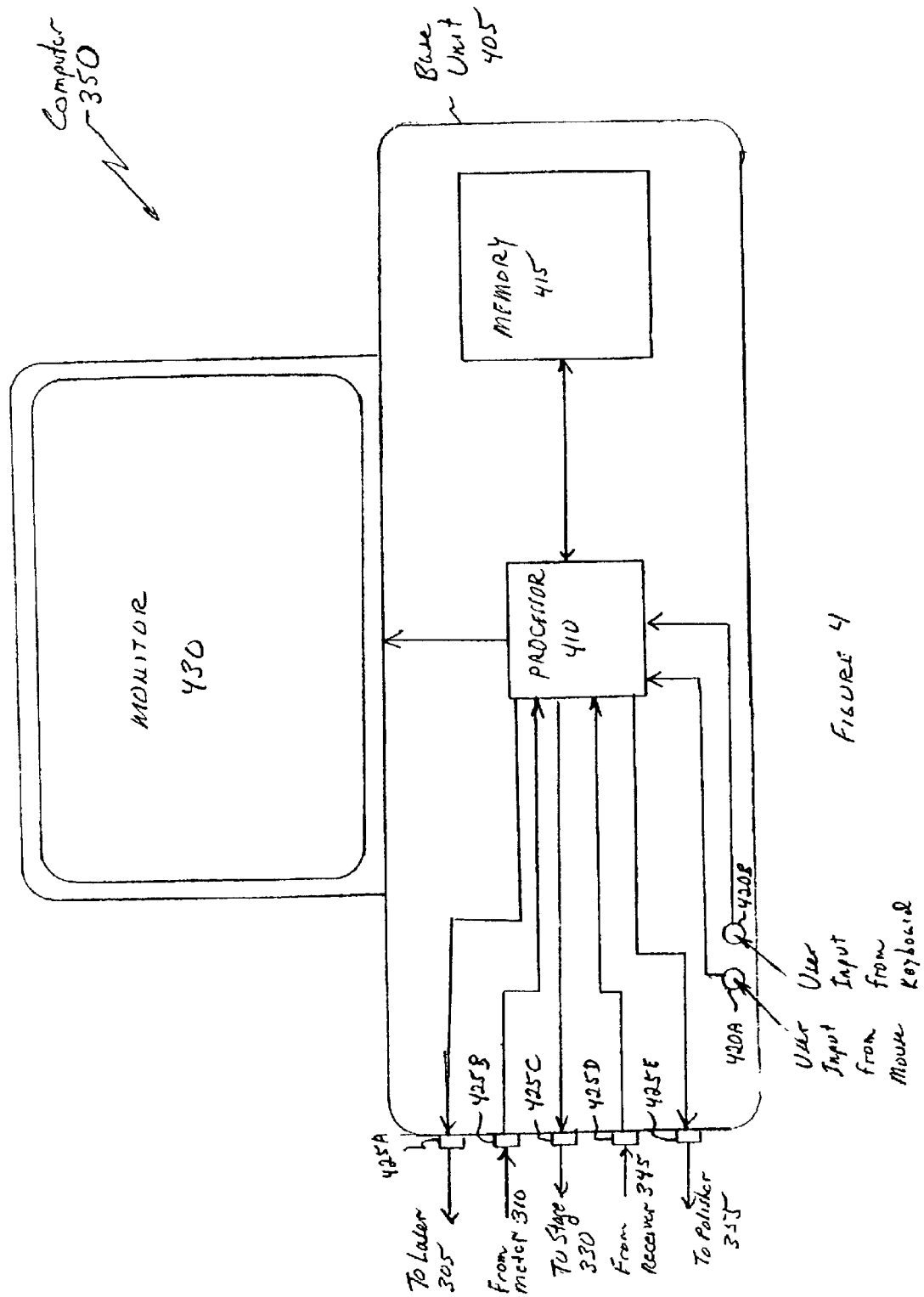

TECHNIQUE FOR FABRICATING HIGH QUALITY OPTICAL COMPONENTS

RELATED APPLICATIONS

This application is a Continuation-In-part of U.S. application Ser. No. 09/872,303, filed Jun. 1, 2001, now U.S. Pat. No. 6,639,682, which claims the benefit of U.S. Provisional Application No. 60/208,863, filed Jun. 2, 2000. The disclosures of both the above referenced applications are incorporated herein in their entirety by reference.

TECHNICAL FIELD

The present invention relates to optical devices and more particularly to the manufacture of high quality micro-optical devices.

BACKGROUND ART

FIG. 1 depicts section of an exemplary conventional micro-optical element 100. The element 100 is in the form of a substantially flat glass plate 110. The glass plate 110 has a primary upper surface 110A and primary lower surface 110B. The glass plate 110 could be in the shape of a square, rectangle, circle or have some other shape. The glass plate could, for example, be for use in one or more etalons or other optical devices.

The primary upper surface 110A and primary lower surface 110B of the glass plate 110 are separated by a distance "d". The transmission characteristics of the glass plate 110 between the primary upper surface 110A and primary lower surface 110B, and more particularly what is commonly referred to as the optical thickness or optical path distance (OPD), will vary with variations in the distance d. In many applications, it is important that the OPD throughout the glass plate 110 be uniform.

A single optical element, such as the plate 110, may form what is commonly characterized as a flat, from which multiple smaller optical sub-elements will be formed. More particularly, a flat is sliced to separate the multiple optical sub-elements. Each separate sub-element may, for example, then be used individually in the manufacture an optical device. Accordingly, it is desirable for each of the multiple sub-elements within the flat, e.g. glass plate 110, to have uniform transmission characteristics, which in turn requires that that the OPD throughout the flat be uniform or uniform within an acceptable tolerance.

To establish a uniform OPD throughout the sub-elements, the conventional practice is to first physically measure the thickness of the optical element. Polishing is performed to remove material from one or more surface of the element based on the physical measurement. The uniformity of the OPD for the element is then optically measured. If required, further polishing and optical measurement of element's OPD uniformity is performed. Once sufficient uniformity has been achieved, the element is sliced in order to separate the individual optical sub-elements.

For example, referring again to FIG. 1, in the case of the glass plate 110 the distance between the primary upper and lower surfaces 110A and 110B at various locations on the plate is measured, using a micrometer, to determine the distance d at each of the measured locations. These determined distances are then used to determine, on a relatively coarse basis, the uniformity of the apparent OPD, which can be computed using the determined distances as is well understood in the art.

Based on the measured distances, a determination is also made as to how much material must be removed from particular areas of one or both of the primary surfaces 110A and 110B to form a plate having a sufficiently uniform thickness d, and therefore a sufficiently uniform apparent OPD, for the particular application. The material is removed by polishing the optical element.

The goal of this initial polishing is to make the surfaces 110A and 110B of the plate perfectly parallel, and hence the apparent OPD perfectly uniform. However, as is recognized by those skilled in the art, the true OPD and the apparent OPD will often vary for at least two reasons. First, the true distance d may differ from the physically measured distance. This is particularly true in the fabrication of micro-optical elements. Additionally, there may be variations in the refractive index of the glass forming the optical element, e.g. the plate 110. Hence, even if the plate 110 has the exact same thickness, and therefore the exact same apparent OPD, at two locations, the true OPD at these locations may vary due to differences in the refractive indexes of the plate material at these locations. Accordingly, to obtain uniformity of the true OPD, it may be necessary for the thickness of the element, e.g. the distance d, to vary at different locations. Therefore, even if the initial polishing results in the surfaces 110A and 110B of the plate being perfectly parallel, this may not result in sufficient uniformity of the true OPD.

Therefore, after the initial polishing, an interferometer (not shown) is typically used to perform an optical measurement by directing a broad beam of light 120 over the entire surface 110A of the plate 110. As is well understood in the art, by visually examining the shading of the light 130 passing through the plate 110, a more accurate determination of the uniformity of the true OPD can be determined.

If the plate surfaces 110A and 110B are perfectly parallel, making the distance d perfectly uniform, and the plate material has a constant refractive index throughout the plate, the OPD will also be perfectly uniform. In such a case, the interferometer light 130 which passes through the plate will appear either light or dark, but in any event of a constant shade of gray or of a constant color when viewed with the naked eye. It will be recognized that the fact that the passing light 130 is light or dark is unimportant. Rather, what is important is that the passing light 130 appears to have a uniform shade or color.

However, if the passing light 130 appears to have a non-uniform shade or color, further polishing is performed on those areas of the appropriate surface(s) 110A and 110B corresponding to the areas of non-uniform shading. This further polishing will be performed whether the non-uniform shading or color, reflecting a non-uniformity of the true OPD, is caused by the plate surfaces 110A and 110B not being perfectly parallel or by the plate material having a varying refractive index or both. It will be understood, if the refractive index varies, uniform shading, and hence a uniform true OPD, can only be achieved if the distance d actually varies slightly in different areas of the optical element, to offset the index variations. After this further polishing, the plate 110 is re-checked, using the interferometer. After inspection indicates a sufficiently uniform true OPD, the plate 110 is sliced into multiple optical sub-elements.

Hence, if the fabricator perceives, through a visual inspection, that a variation in shading or color exist in the middle of the optical element, a small portion of the material in the middle of the element is removed by polishing. If visual inspection of the passing light indicates that the shading is sufficiently uniform, no further polishing is performed and the optical element can be sliced into respective sub-elements or used in a further flat assembly as will be described below with reference to FIG. 2.

FIG. 2 shows an exemplary portion of a conventional flat of micro-optical devices, commonly characterized as etalons. The depicted etalon is formed of a portion of top plate 210A and bottom plate 210B, which are both formed of glass. Plates 210A and 210B are substantially identical to plate 110 of FIG. 1. The glass plates 210A and 210B are separated by spacers 260A and 260B to create a cavity 270. It will be understood that additional spacers (not shown) are used to separate the plates 210A and 210B to form the other etalons which will be sliced from the flat.

In the FIG. 2 example, since air fills the cavity 270, the depicted etalon is of the type commonly referred to as an air space etalon. As will be recognized by those skilled in the art, if glass filled the cavity 270, the etalon would be of a type commonly referred to as a solid etalon. If water, or some other liquid, filled the cavity 270, the etalon would be of a type commonly referred to as a liquid etalon.

Also disposed within the cavity is a top coating layer 230A formed on lower main surface of the top glass plate 210A, and a bottom coating layer 230B formed on the upper main surface of the bottom glass plate 210B. The top and bottom coatings are separated by a distance "d", which can be used to determine the apparent optical thickness or OPD of the cavity 270. The transmission characteristics and hence the OPD of the etalon will vary with variations in the OPD of the glass plate 210A, glass plate 210B and cavity 270.

In the case of the cavity 270, conventionally the distance d is approximated by physically measuring the spacers 260A and 260B, which form the cavity 270, at various locations. This approximation is used to determine the uniformity of the apparent OPD of cavity 270. If deemed necessary, the spacers 160A and/or 160B are polished to modify d, and hence the uniformity of the apparent OPD of the cavity 270.

After any required polishing of the plates 210A and 210B, as discussed above with reference to FIG. 1, and the spacers, including spacers 160A and 160B, which separate the plates 210A and 210B to form the individual etalons to be sliced from the flat 200, uniformity of the OPD of the flat of etalons is checked using an interferometer, in a manner similar to that described above with respect to plate 110 of FIG. 1. The upper surface, i.e. the outside surface, of plate 210A and/or the lower surface, i.e. the outside surface, of plate 210B are further polished as deemed necessary in view of the shading of the light passing through the etalon during initial and any subsequent interferometer testing, until sufficient uniformity of the true OPD is achieved. Once polishing is completed the flat assembly is sliced into multiple etalons.

There are fundamental problems with the above described conventional optical device fabrication technique, particularly when used in micro-optic applications. One problem is that the uniformity of the shading or color is determined subjectively. Hence, different inspectors may come to different determinations with respect to the uniformity of the OPD.

Further, it is often difficult for fabricators to judge the variation in that shading to the degree necessary to fabricate plates or optical assemblies having a uniform true OPD to the accuracy level required for micro optics applications. Such applications may require uniformity in the distance d of, for example, 5 nano-meters or less. Such minor distance variations are undetectable by visual inspection. Typically, distance variation of about 60 nanometers or less are not detectable using conventional techniques.

Additionally, because optical elements and devices are commonly fabricated in flats, if polishing errors occur the entire flat must often be discarded. This is because it is extremely difficult, using the conventional techniques, to determine which particular optical sub-elements are affected by the errors. This in turn adds to the time and cost of fabrication.

Moreover, because of the human element involved in the polishing and inspection, conventional techniques frequently result in polishing errors. Therefore substantial waste occurs in the conventional fabrication process.

A still further problem occurs if the optical element or device is intended to be in a form requiring non-parallel surfaces, such as a wedge. In such cases, some variations in shading are required, while others will need to be eliminated through polishing. Thus, the fabricator, using a visual inspection, must be able to distinguish between those variations which are desirable and those which are undesirable. This requires significant skill and experience on the part of the fabricator, and makes the fabrication of such optical elements and devices extremely difficult.

Accordingly, a need exists for an improved technique for fabricating optical elements and devices having the desired optical characteristics, including optical elements and assemblies having a substantially uniform true OPD and individual flats having a number of such elements and devices.

OBJECTIVES OF THE INVENTION

It is accordingly an object of the present invention to provide an improved technique for fabricating optical elements and devices, referred to generally as optical components, having the desired optical characteristics, including optical elements and devices having a substantially uniform true OPD and individual flats having a number of such elements or devices.

It also an object of the present invention to provide a technique, particularly suitable for use in micro-optic applications, for determining the uniformity of the true OPD of an optical element or device in an objective manner.

It is another object of the present invention to provide a technique which can be used by different inspectors to make the same determinations with respect to uniformity of the OPD of optical elements or devices.

It is yet another object of the present invention to provide a technique for fabricating optical elements or devices having a highly accurate OPD, such as that required for micro optics applications.

It is additionally an object of the present invention to provide a technique which allows acceptable optical elements or devices within a flat to be utilized and only unacceptable optical elements or devices within a flat to be discarded.

A still further object of the invention, is to provide a technique which can be used to reduce the frequency of polishing errors in fabricating optical elements or devices.

It is also an object of the invention to provide a technique which simplifies the fabrication of optical elements and devices that require non-parallel surfaces, such as those in the form of a wedge.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the invention, a system is provided for determining the uniformity of an optical component. The optical component may be a single piece of glass or other transmissive optical material with parallel surfaces or could be a more complex optical component such as an etalon, wedge or spiral shaped optical component, an optical component which has a radially varying thickness or some other complex form component. The component may be coated with a dielectric coating or non-coated. The optical component could be part of a flat of optical components, which will subsequently be sliced to separate the individual optical components from each other. Notwithstanding the type or form of the optical component, the component can be viewed as having opposed primary surfaces through which light is intended to pass during its utilization.

The system includes a laser light beam emitter for emitting a light beam to impinge on one of the primary surfaces of the optical component at each of multiple points, and for modifying a characteristic, such as the wavelength or angle of incidence, of the impinging light beam at each of the multiple points so as to have multiple different values. The light beam will be a relatively narrow spot beam and typically impinge on only one point at a time. In one preferred embodiment of the invention, the emitter is in the form of a highly accurate tunable laser. However, other types of lasers could be used including multiple non-tunable lasers or multi-power lasers. A detector detects light from the impinging light beam that passes through the other primary surface of optical component at each of the multiple points, with the light beam characteristic having each of the multiple different values.

A processor, which could be part of a personal computer (PC) or other type computer programmed with the logic to perform the described functions, determines the non-uniformity of the optical component based on the detected passing light. Beneficially, the processor generates control signals to modify the characteristic, e.g. the wavelength or angle of incidence, of the emitted light beam impinging the primary surface of the optical component at each of the multiple points, so that the impinging light beam at each point has multiple different characteristic values. Preferably, the processor determines the non-uniformity of the optical component by computing a characteristic of the optical component at each of the multiple points based on the detected passing light. Advantageously, the processor also generates a contour map of the optical component based on the determined non-uniformity.

In accordance with other aspects of the invention, the emitted light beam is directed along a path. The processor generates emitter control signals to control the emission of the light beam by the laser light beam emitter as discussed above, and alignment control signals to align each of the multiple points with the path of the emitted light beam prior to the light beam being emitted to impinge on the optical component at the applicable point. A stage, such as an X-Y stage, supports and moves the optical component in accordance with the generated alignment control signals.

In accordance with further aspects of the invention, the processor also generates polish control signals based on the determined non-uniformity of the optical component. A polisher is provided to remove material from the optical component based on the generated polish control signals.

In a particularly advantageous implementation, the stage moves the optical component in accordance with the generated alignment control signals, such that the multiple points, at which the emitted light beam impinges on the one primary surface of the optical component, form a pattern of impinge points arranged in a first grid. However, each of the impinge points in the first grid is a first distance from adjacent ones of the impinge points in the grid. Based on the generated polish control signals, the polisher removes material from at least one of the primary surfaces of the optical component at multiple polish points. The polish points also-form a pattern of polish points arranged in a second grid which corresponds to the first grid. However, each of the polish points in the second grid is a second distance from adjacent ones of the polish points in the grid. The second distance may be the same as or different than the first distance. If different, the second distance will typically be smaller than the first distance.

The processor may, for example, determine the non-uniformity of the optical component by computing either an apparent optical thickness or optical path distance (OPD) of the optical component at each of the multiple points based on the detected passing light. The processor then normalizes the computed apparent optical thickness or optical path distance (OPD) of the optical component at each of the multiple points based on the detected passing light. The processor generates the polish control signals based on the normalized apparent optical thickness or optical path distance (OPD) at each of the multiple points. In such a case, the polisher will remove material from at least one of the primary surfaces of the optical component at the multiple points based on the generated polish control signals. The above described contour map could represent the computed apparent optical thickness or optical path distance (OPD) of the optical component at each of the multiple points.

According to yet another aspect of the invention, the processor determines a maximum non-uniformity with respect to all of the multiple points and compares the determined maximum non-uniformity with a threshold maximum non-uniformity value. The maximum non-uniformity is preferably determined with respect to all of the multiple points based, for example, on the maximum difference between the computed apparent optical thicknesses or optical path distances (OPDs) of the optical component, at any two of the multiple points. Based on this comparison, the processor can determine if polishing is required. If so, the polish control signals are generated. If not, the polish control signals need not be generated.

According to-still other aspects of the invention, the processor may be further configured to generate a pass indicator if it is determined that polishing is not required and a fail indicator if it is determined that polishing is required.

The polisher may be programmed to generate a predicted result of the material removal based on the polish control signals. The processor could then determine whether to proceed with the material removal based on the generated predicted result. If so, the processor will generate the polish control signals to direct the polisher to remove material from the optical component. Otherwise, the processor need not generate the polish control signals.

Beneficially, a user input device is provided for entering a minimum thickness of the material to be removed by the polisher. Based on this input and the determined non-uniformity of the optical component, the polisher generates the predicted result. If the processor determines not to proceed with the removal of material based on the generated predicted result, the user input device can be operated to enter a another minimum thickness of material to be removed by the polisher. The polisher will then generate another predicted result based on the determined non-uniformity of the optical component and the later identified minimum thickness. The processor can now determine whether to proceed with the material removal based on the later generated predicted result.

The invention can also be used to assist in predicting the effects of subsequent coating on an optical component, thereby allowing the polishing of the optical component taking into account the subsequent application of the coating after polishing. For example, after the characteristic, e.g. the apparent optical thickness or OPD of a coated optical component has been determined by comparing the apparent optical thickness or OPD determined after coating to the apparent optical thickness or OPD determined before coating, the polisher can remove material from another, or second, non-coated optical component taking into consideration the determined characteristic of the coated optical component.

More particularly, the laser light beam emitter can emit a light beam to impinge on one of the primary surfaces of the non-coated optical component at each of multiple points, and modify the applicable characteristic, e.g. the wavelength or angle of incidence, at each of the multiple points so as to have multiple different values. The detector detects light from the impinging light beam that passes through the other primary surface of non-coated optical component at each of the multiple points, with the light beam characteristic at each of the multiple different values.

The processor determines the non-uniformity of the non-coated optical component based on the detected passing light. The processor then generates the polish control signals based on the determined non-uniformity of the non-coated optical component and the determined non-uniformity of the coated optical component. Finally, the polisher removes material from the non-coated optical component based on the generated polish control signals.

It should be understood that the polisher may remove material from a coated or non-coated surface of the optical component, and the polishing may be performed on the impinge surface, the opposing surface, or both primary surfaces of the optical component at the multiple polish points. The optical component may be polished so as to have a complex shape, such as that of a wedge or spiral, or a non-complex shape. Rather than removing material, material could be added to the optical component based on the determined non-uniformity of the optical component. If the optical component forms part of a flat of multiple optical components, the optical component may be marked as unacceptable based on the determined non-uniformity. A high power laser having a beam path co-axial with that of the laser described above could be controlled by the processor to perform such marking. In any event, after measurement and polishing have been completely for all the optical components forming the flat, the flat can be sliced to separate each of the optical components from the other optical components forming the flat.

BEST MODE FOR CARRYING OUT THE INVENTION

Figure 3:
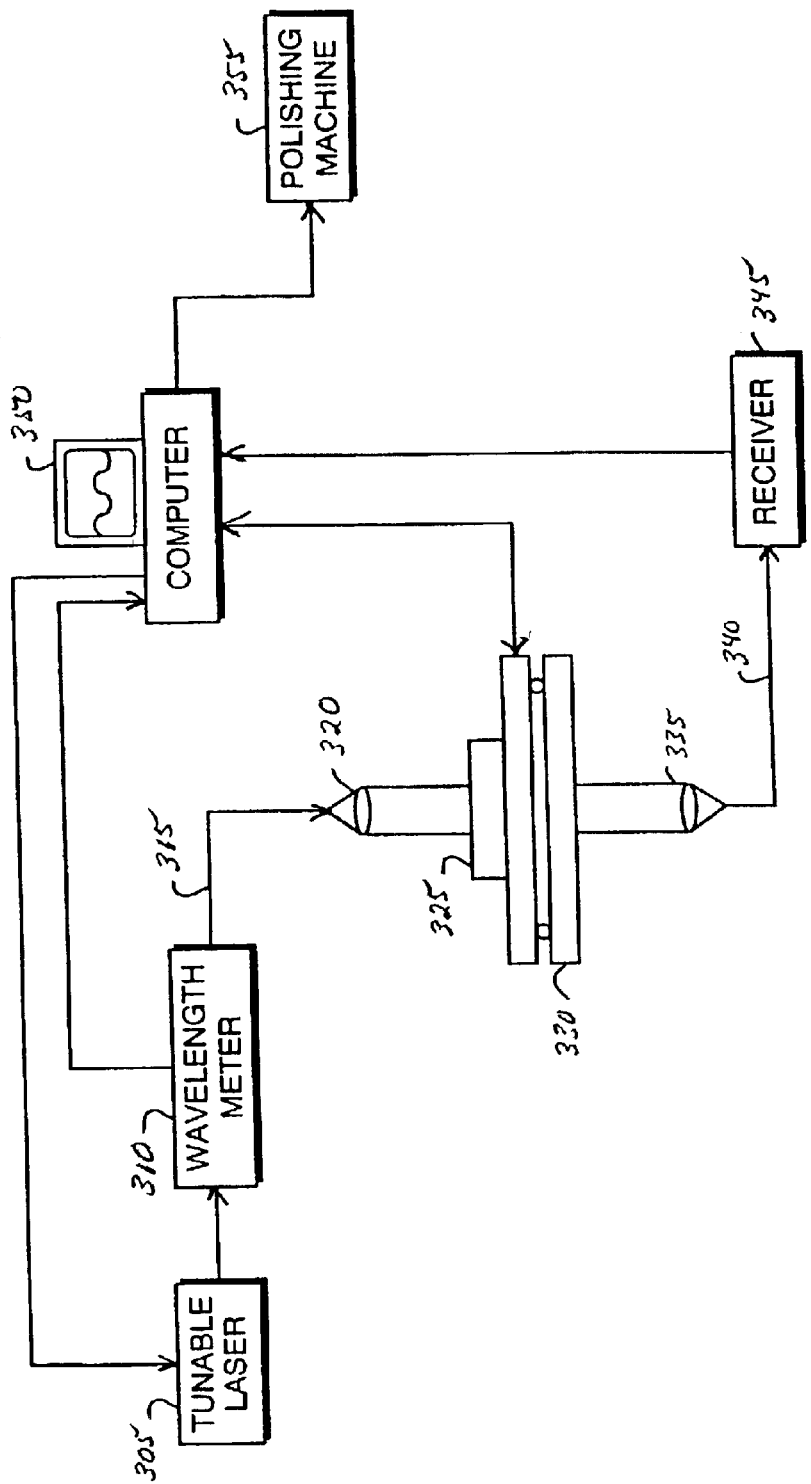
FIG. 3 depicts a measuring and polishing system for fabricating high quality optical devices in accordance with the present invention.

FIG. 3 depicts a measuring and polishing system in accordance with the present invention. As shown, the measuring and polishing system includes a tunable laser 305 and optional wavelength meter 310 which may form part of a single unit, such as the JDS Uniphase SWS 15100 unit. The tunable laser 305 emits narrow light spot beams at any of various wavelengths. The wavelength meter 310 provides an output corresponding to the actual wavelength of the laser light being emitted by the tunable laser 305. It should be understood that the wavelength meter is only necessary to confirm that the light beam being emitted by the tunable laser 305 is at the desired wavelength.

The light beam is directed from the wavelength meter via a fiber optic cable 315 to a collimating lens 320 which directs the beam to a point on an optical work piece or component 325, which could, for example, be an optical element or device, or some other optical component or a flat of optical components. As shown, the optical work piece 325 is a glass plate.

The optical work piece 325 is supported by a stage 330 which is movable in at least two horizontal directions. The stage may also be movable vertically to adjust the focus of the focus beam at the work piece 325. Stages such as stage 330 are commonly referred to as X-Y stages.

The light passing through the optical work piece 325 is directed towards a collimating lens 320. This focused light is then directed by fiber optic cable 340 to an optical receiver 345, which could, for example, be a JDS Uniphase receiver. Data corresponding to the light received via optical cable 340 is transmitted from the receiver 345 to a computer 350 which serves as a system controller. The computer 350 could, for example, be a conventional personal computer (PC) which has been programmed to perform the functions which will be described further below.

As also shown in FIG. 3, the computer 350 outputs signals to control the wavelength of the light beam emitted by the tunable laser 305, signals to control the movement of the X-Y stage 330 and signals to control the polishing performed by the polishing machine 355.

Figure 4:
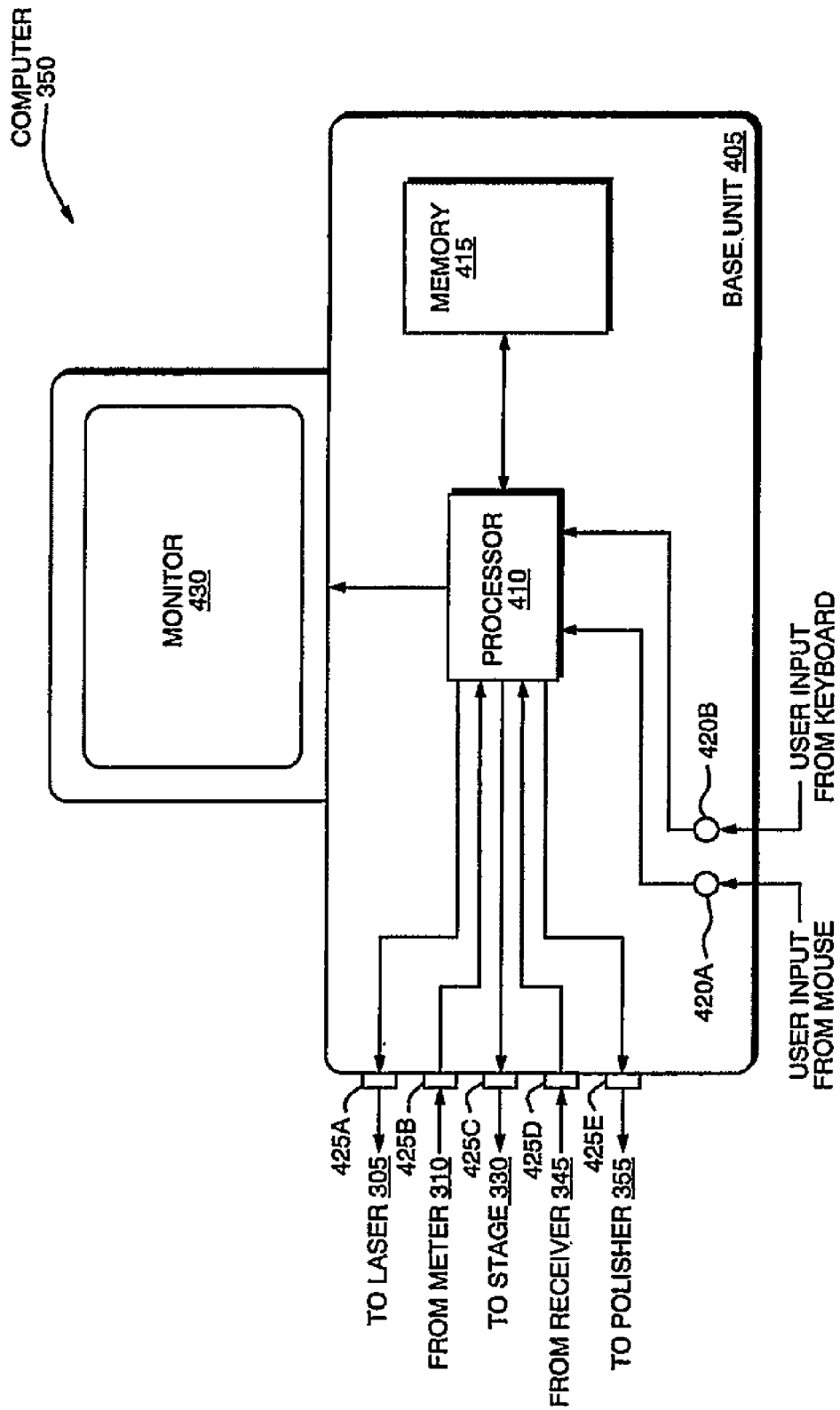
FIG. 4 shows a more detailed depiction of the computer of FIG. 3.
Figure 5:
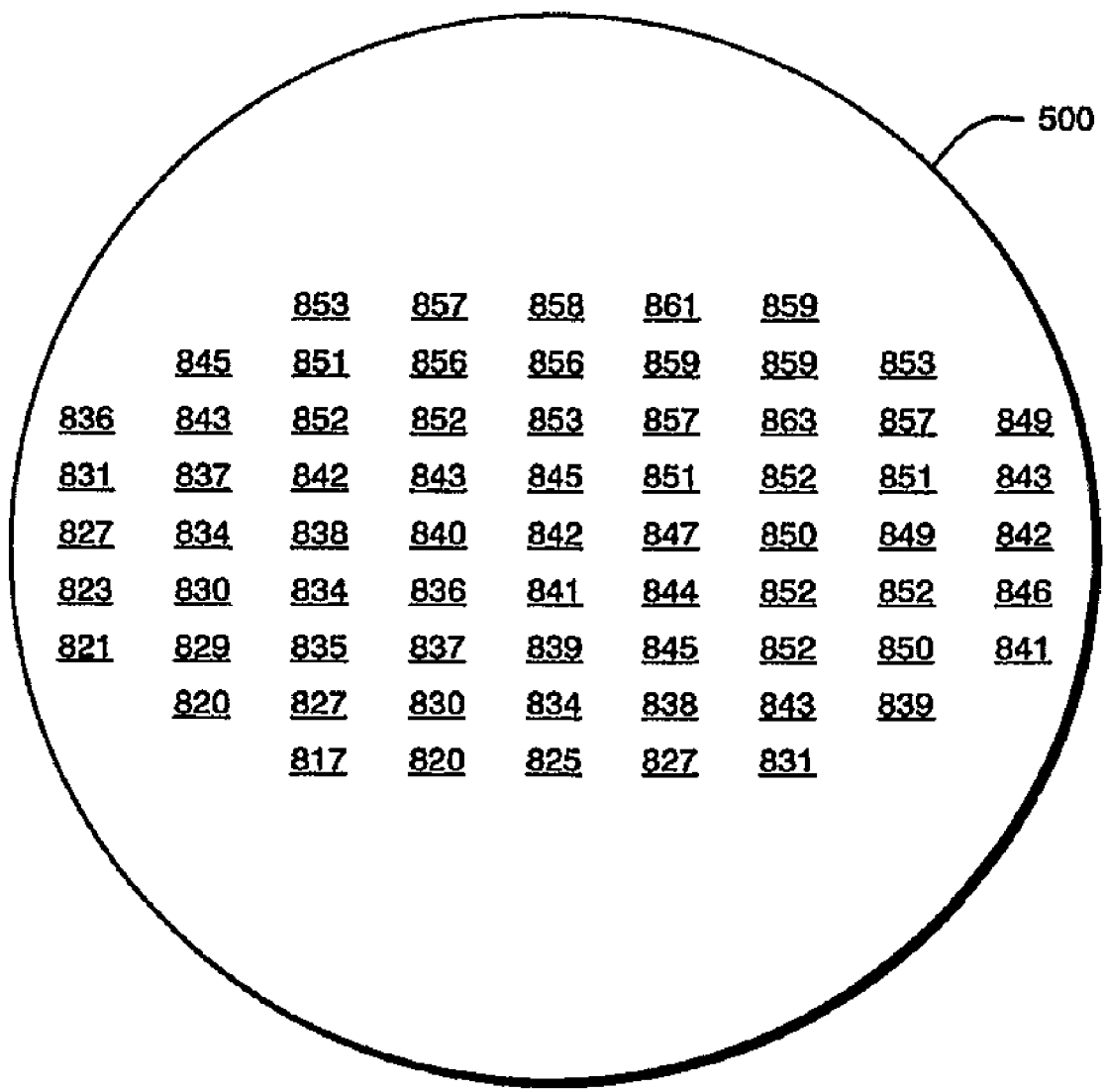
Figure 6:
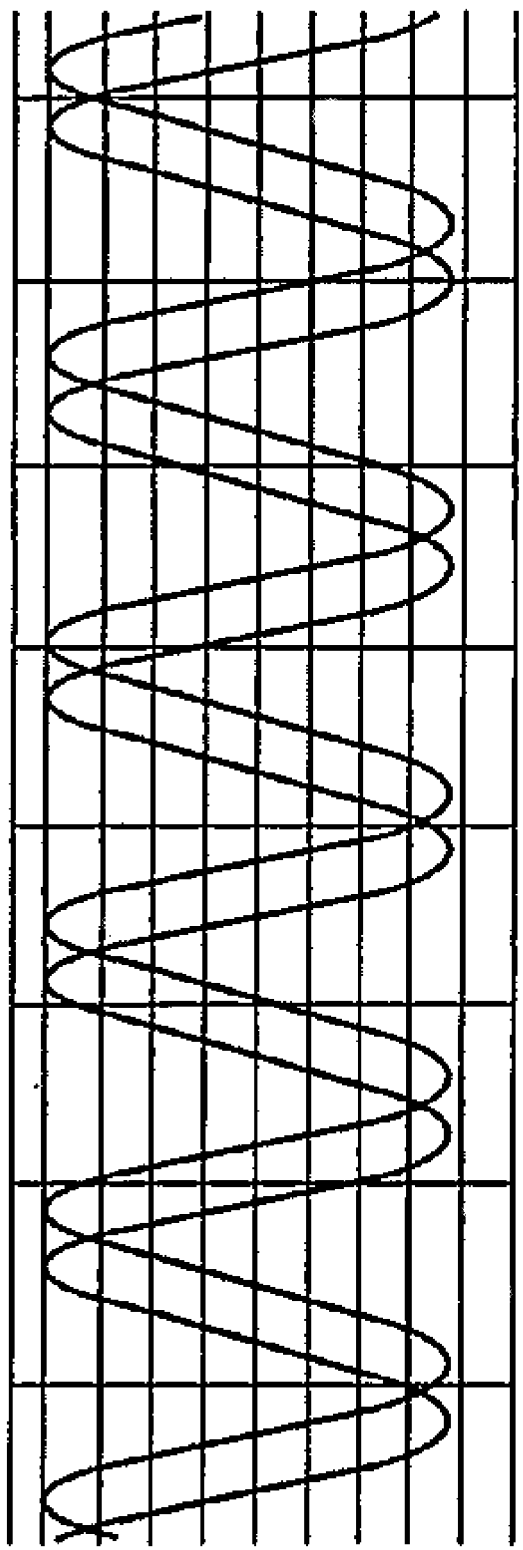
Figure 7:
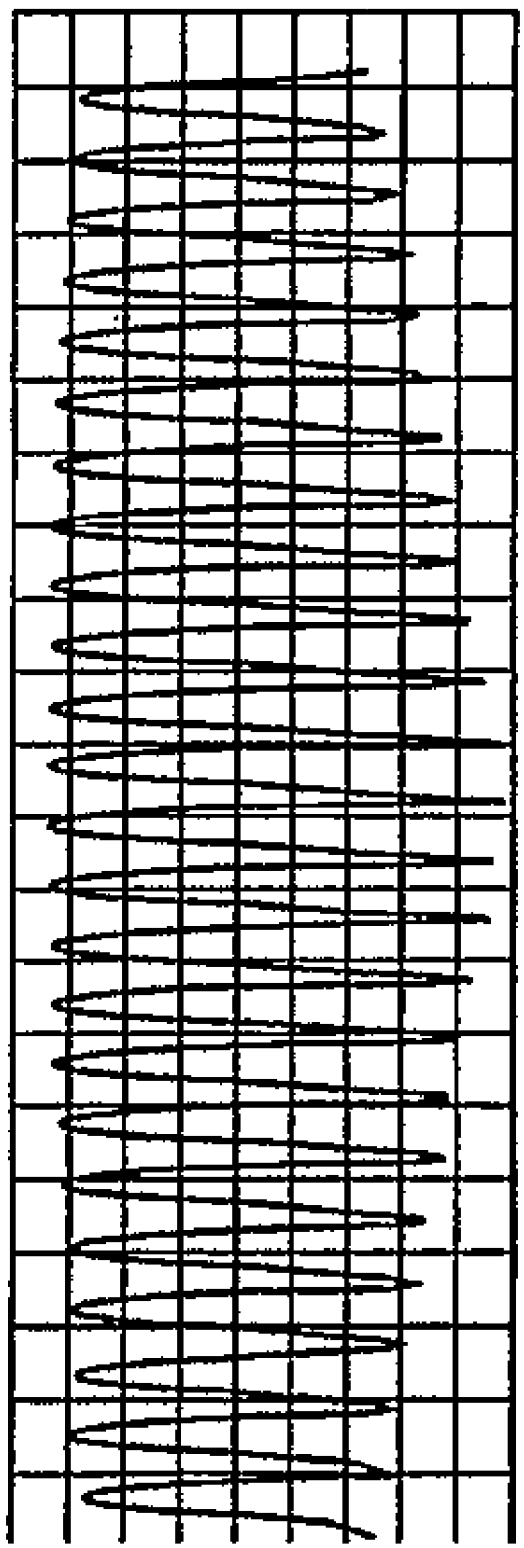

FIG. 4 is a somewhat simplified depiction of the computer 350 of FIG. 3. As shown, the computer 350 includes a base unit 405 which houses a processor 410 and a memory 415 interconnected thereto. The memory stores the programmed logic which causes the processor to perform the functions necessary to control the system operations. The processor is also interconnected to a monitor 430 and drives the display of information on the monitor 430 to the user. The base unit also includes user input ports 420A and 420B for receiving inputs from a mouse, keyboard and/or other user input devices. These inputs are also directed to the processor 410 for processing in accordance with the programmed logic stored in the memory 415. It should be noted that the memory 415 may include any type, or could include multiple types, of memory. For example, memory 415 may include a hard disk, read only memory (ROM), random access memory (RAM), cache memory, flash memory and/ or any other type of memory that may be appropriate for storing either the programmed logic or other data during system operations.

The base also includes ports 425A–425E which respectively connect to the tunable laser 305, wavelength meter 310, X-Y stage 330, optical receiver 345, and polisher 355 of FIG. 3. Information from the meter 310 and receiver 345 is directed from ports 425B and 425D to the processor 410 for processing. Data from the processor 410 is directed by ports 425A, 425C and 425E to either the laser 305, X-Y stage 330 or polisher 355.

Referring again to FIG. 3, in its most basic operation, the computer 350 controls the tunable laser 305 to emit a laser beam having a constant level of light and varying, i.e. modulated, wavelengths. The wavelength accuracy of the emitted beam is beneficially very high. The JDS Uniphase "Swept Wavelength System" ("SWS") referenced above emits laser beams having selectable wavelengths of high accuracy. The beam is "swept" over the selected wavelengths. Unlike light from an interferometer, which emits a broad beam over large area, typically the entire surface of the optical component, the tunable laser 305 emits a narrow spot beam, often referred to as a point beam, directed at only a very localized area, typically a point on the surface of the optical component.

The computer 350 also controls the movement of the X-Y stage 330 to locate the optical component 325 such that the swept beam is directed to particular points on the component 325, which correspond to a grid pattern generated by the computer 350 for the component. Thus, by controlling the movement of the X-Y stage 330 and the emission of laser light beams at the selected wavelengths by the tunable laser 305, laser light beams of multiple wavelengths are directed to each of the grid locations on the optical component.

The receiver 345 detects the light passing through the optical component 325 at each of the selected wavelengths for each of the grid locations. Using the detected light, the receiver 345 generates an output to the computer 350 which corresponds to the intensity of the detected light as a function of each wavelength for each grid point.

Beneficially, the generated data very accurately corresponds to the actual intensity of the light passing through the optical element 325. JDS Uniphase commercially markets a receiver, for use with the JDS Uniphase "Swept Wavelength System" referenced above, which is capable of generating such data. The computer 350, processes the measured data received from the receiver 345, in accordance with its programmed logic, to quantify the variations in the optical characteristics, and more particularly the optical path distance (OPD), of the optical component 325.

It will be recognized that because all parameters other than the beam wavelength at each grid point are fixed, the intensity of the detected light passing through the component 325 at a particular grid point necessarily only varies with the variations in the wavelength of the emitted light beam. That is, the intensity of the light passing through the component at a particular grid location varies as a function of the wavelength because the constructive/destructive interference of the component 325 at a particular point also varies as a function of the wavelength.

Thus, the receiver 345 acquires and stores modulated waveforms corresponding to the intensity of the swept wavelength beam passing through the optical component 325 at a particular grid point. Stated another way, the acquired modulated waveforms will represent the intensity of the light, at every selected wavelength, passing through the optical component 325 at a particular grid point. The data output from the receiver 425 to the computer 325 for each grid point represents the applicable wavelengths and the associate intensity at each of the wavelengths for the applicable grid point.

The receiver 345 output can, for example, be processed by the computer 350 to determine the selected wavelength at which the destructive interference is at a maximum and the selected wavelength at which the destructive interference is at a minimum. However, in order to associate the receiver output with its corresponding point on the optical component 325 to which it relates, the computer 350 must relate each wavelength and intensity pair with the corresponding grid point on the X-Y stage 330.

To do this, the computer 350 first relates the applicable coordinates of the grid point on X-Y stage with the corresponding wavelength and intensity pair, and then associates the applicable grid point with a particular point on the optical component 325. That is, the received wavelength and intensity data resulting from the control of both the tunable laser 305 to emit the swept beam at the selected wavelengths and the X-Y stage 330 to simultaneously locate the optical component 325 such that the emitted swept beam is directed to a particular grid point on the X-Y stage 330, are first related to that particular grid point by the computer 350. This relational step is performed for each point on the grid.

The computer 350 could, if desired, be programmed to store the grid point coordinates used to control the X-Y stage 330 and associate the stored coordinates with the received data. However, preferably, the X-Y stage 330 outputs coordinate data corresponding to a present location and this data is associated by the computer 350 with the output of receiver 345 which corresponds to the light from the swept beam passing through this location, i.e. the corresponding wavelength and intensity data for that location output from the receiver 345. The computer 350 then associates the corresponding point on the optical component 325 with the coordinate data output from the X-Y stage 330, and hence the corresponding wavelength and intensity data, i.e. the measured waveform, output from the receiver 345.

The computer 350. compares the measured waveforms to expected waveforms to determine how closely the measured and expected waveforms match. The expected waveforms are generated based on the refractive index of the material forming the optical component 325 and an estimated range of thicknesses of the optical component 325. Using these two parameters the computer 350 generates waveforms over the applicable selected wavelengths at the estimated thicknesses.

Figure 1:
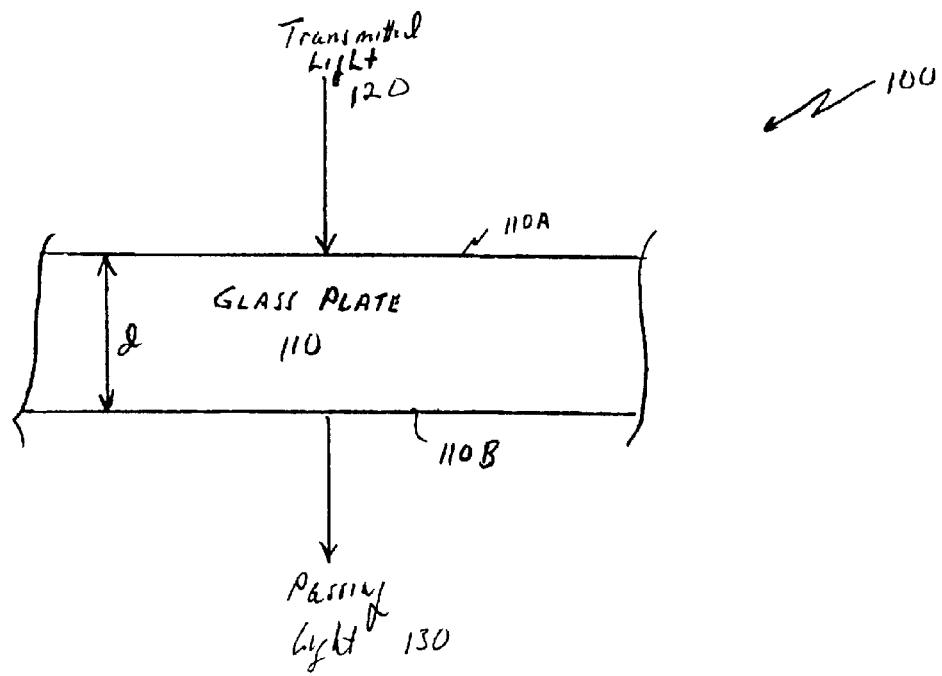
FIG. 1 depicts a conventional optical element or flat of optical elements.

To determine the range of estimated thicknesses for which expected waveforms are to be generated, the operator inputs an initially estimated thickness, e.g. a mechanically measured thickness, such as the distance "d" in FIG. 1, of the optical component 325 to the computer 350 as a starting point. Based on the initially estimated thickness, the computer 350 determines the range of thicknesses to be considered, and generates expected waveforms over the range of thicknesses. For example, if the mechanically measured thickness of the optical component is 1000 microns, this value is input as the initially estimated thickness. The computer 350 might then determine that a range of estimated thicknesses from 990 microns to 1010 microns will be used. The computer 350 then generates the expected waveforms over the selected wavelengths for optical component thicknesses of 990 microns to 1010 microns.

The computer 350 compares the expected waveform for the various wavelengths over the range of thicknesses with the measured waveforms over the corresponding wavelengths at the particular point of interest. Based on this comparison, the computer 350 identifies the expected waveforms that most closely match the measured waveforms at the various wavelengths. Based on the identified most closely matching expected and measured waveforms, the computer 350 computes the apparent optical thickness or OPD of the optical component 325 at the point under consideration, assuming a constant refractory index.

The following summarizes the procedure used to determine the apparent optical thickness or OPD, at each of the selected grid points.

1. User is required to enter estimated thickness of material to be measured and type of material to be measured.
   Estimated Thickness=80 μm
   Material Type=LAH58
2. Software acquires measured transmitted waveform. Waveform consists of transmitted power (intensity) levels measured through the material of interest at discrete wavelengths in the C Band (1520 nm–1570 nm).
   The following lines show the first six points of the wavelength and power arrays. Each array contains a total of 16830 values.
   Wavelength=1520.090, 1520.092, 1520.095, 1520.098, 1520.101, 1520.104
   Power=−0.171, −0.165, −0.140, −0.128, −0.104.
3. Measured waveform is smoothed using a median filter. A median filter is a nonlinear filter that removes high frequency noise.
4. A new waveform array is generated using evenly spaced samples from the measured waveform array. Two arrays, one for power and one for wavelength, are generated using a coarse sample separation of 100 points.
5. An index of refraction array is generated using the wavelengths in the coarse array generated in the previous step. These indexes are generated based on hard-coded dispersion constants and appropriate dispersion formulae for the type of material selected by the user. Arrays for T (transmission) and R (reflection) are also generated, based on the index values generated. The following example shows the dispersion formula used to calculate index, T, R, R1
   For (I=0,I<3,I++)

Index=($k(I)$×wave^2)/(wave^2−1($I$))

Index=index+1

Index=sqrt(index)

$R$=((index−index(air))/(index+index (air)))^2

$T$=1−$R$ $R1$=(1−$R$)^2

Where index=index of refraction, k and l are dispersion constants for the material LAH58, wave is the current wavelength of interest, T is the transmission level of the material, R is the reflection level of the material.

6. Using the above parameters, a theoretical waveform is generated for each thickness within a predefined range of the estimated thickness entered by the user.
   The following shows the method used to calculate a single theoretical transmitted power level for the material of interest.

inSin=(2×$PI$×Index×$t$)/wave $gp$=10log(($T$^2/$R1$)^(1/($I$+((4×$R$)/$R1$)×(sin(inSin))^2)))

Where gp is the generated theoretical power level, and t is the estimated thickness.
7. The power level at each discrete wavelength in each of these theoretical waveforms is subtracted from the power level at each discrete wavelength in the coarse measured waveform to produce an error value.

$$\Box \ gp = 10\text{LOG}\left[\frac{T^2}{(1-R)} \times \frac{1}{1+\frac{4R}{(1R)^2}}\text{SIN}^2\left(\frac{2\pi nd}{\lambda}\text{COS}\sigma\right)\right]$$

Where,
T=Transmission
R=Reflection
n=Refractive Index (function of wavelength) of Substrate
d=Substrate Thickness
θ=Angle of Incidence (Assumed to Be 0° therefore COSθ=1)

8. These error values are stored in an array as well so that for every thickness in the thickness array there is a corresponding error value.
9. The index of the minimum error in the error array is used to find the thickness which most closely creates a waveform that matches the measured waveform. The minimum value in the above "Error Waveform" was found to occur at 798.121 μm.
10. This thickness is taken to be the apparent optical thickness or OPD of the material under test.

Figure 6:
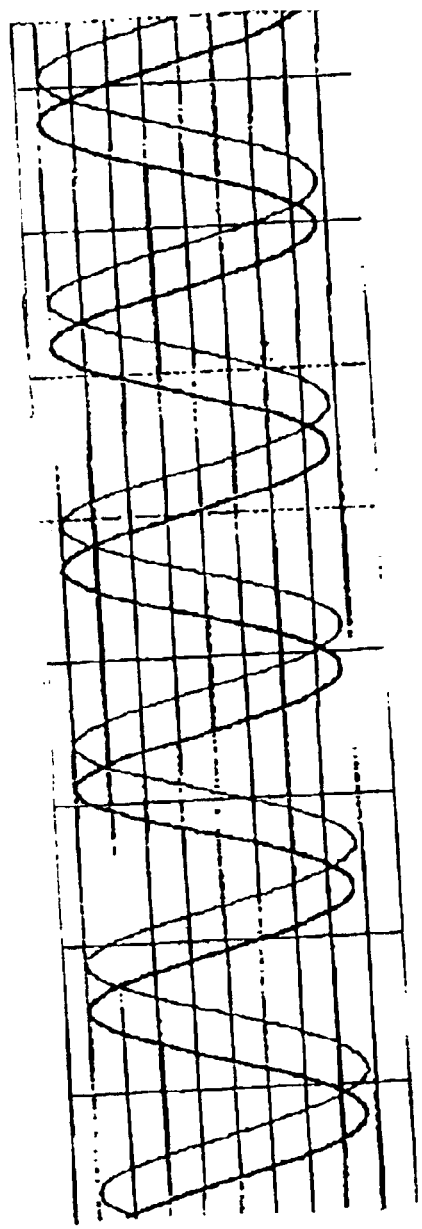
FIG. 6 is an exemplary depiction of a comparison of a generated expected waveform and a measured waveform.
Figure 7:
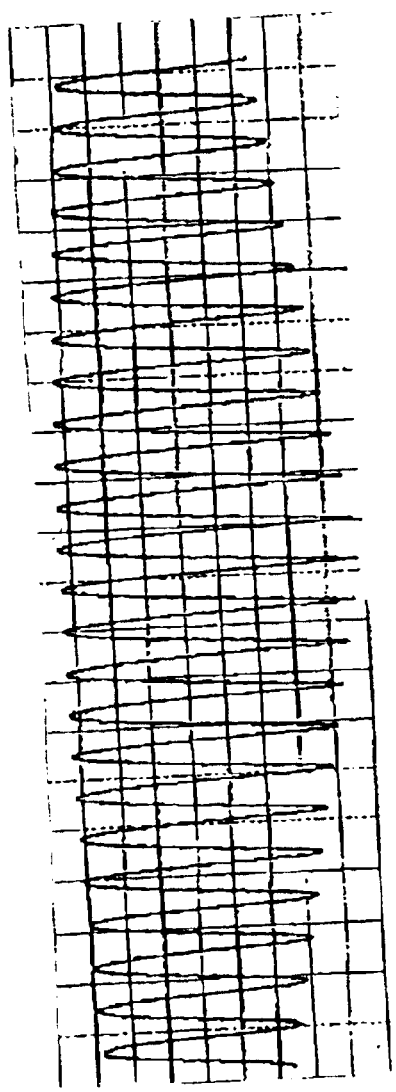
FIG. 7 is an exemplary depiction of a generated error waveform resulting from the comparison shown in FIG. 6.
Figure 1:
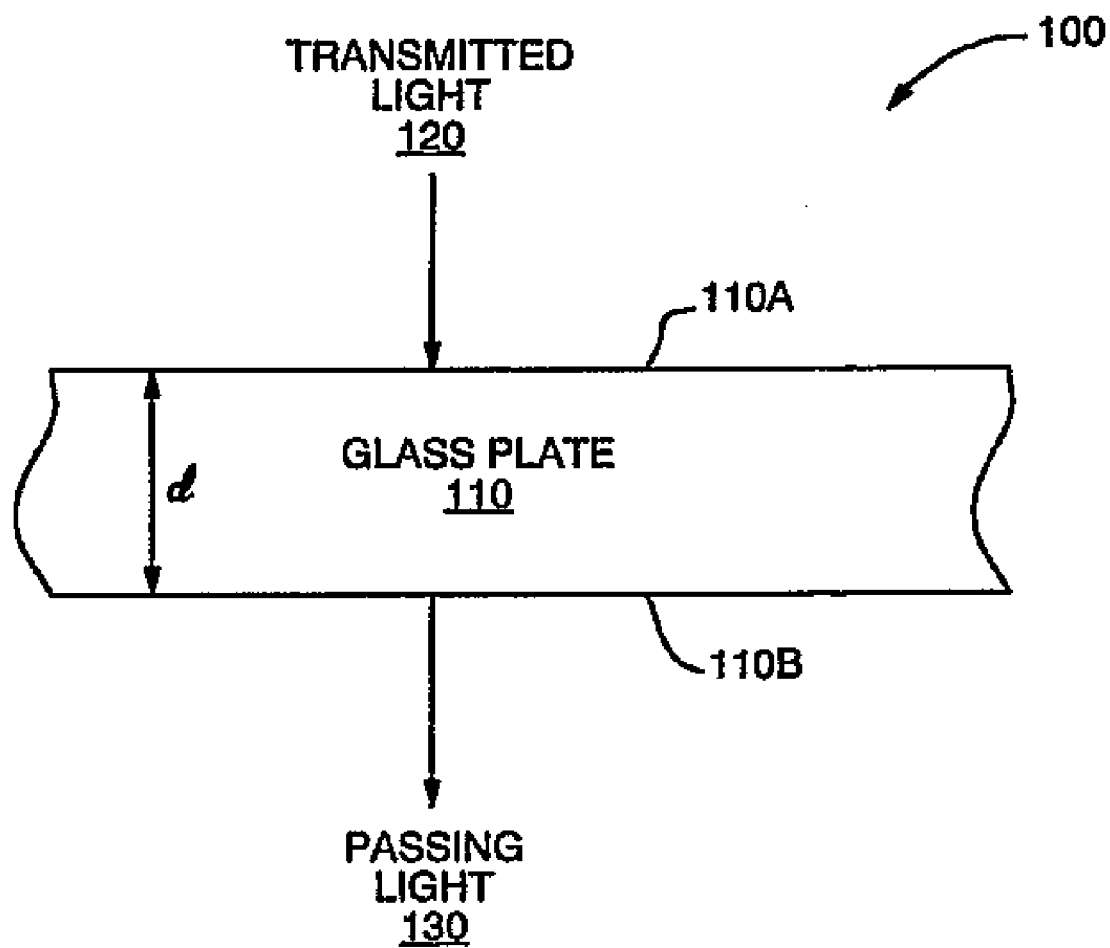
Figure 2:
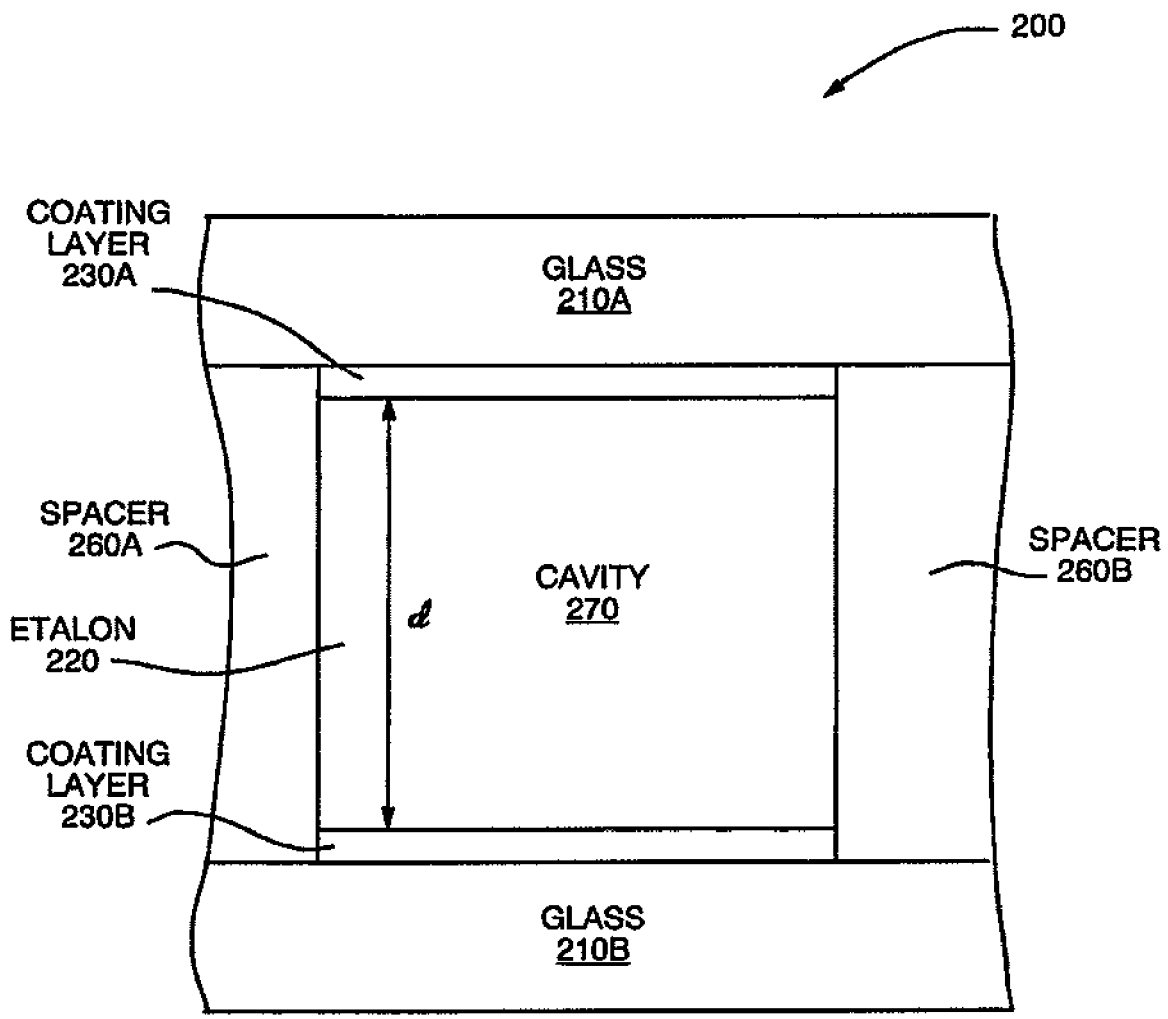
Figure 3:
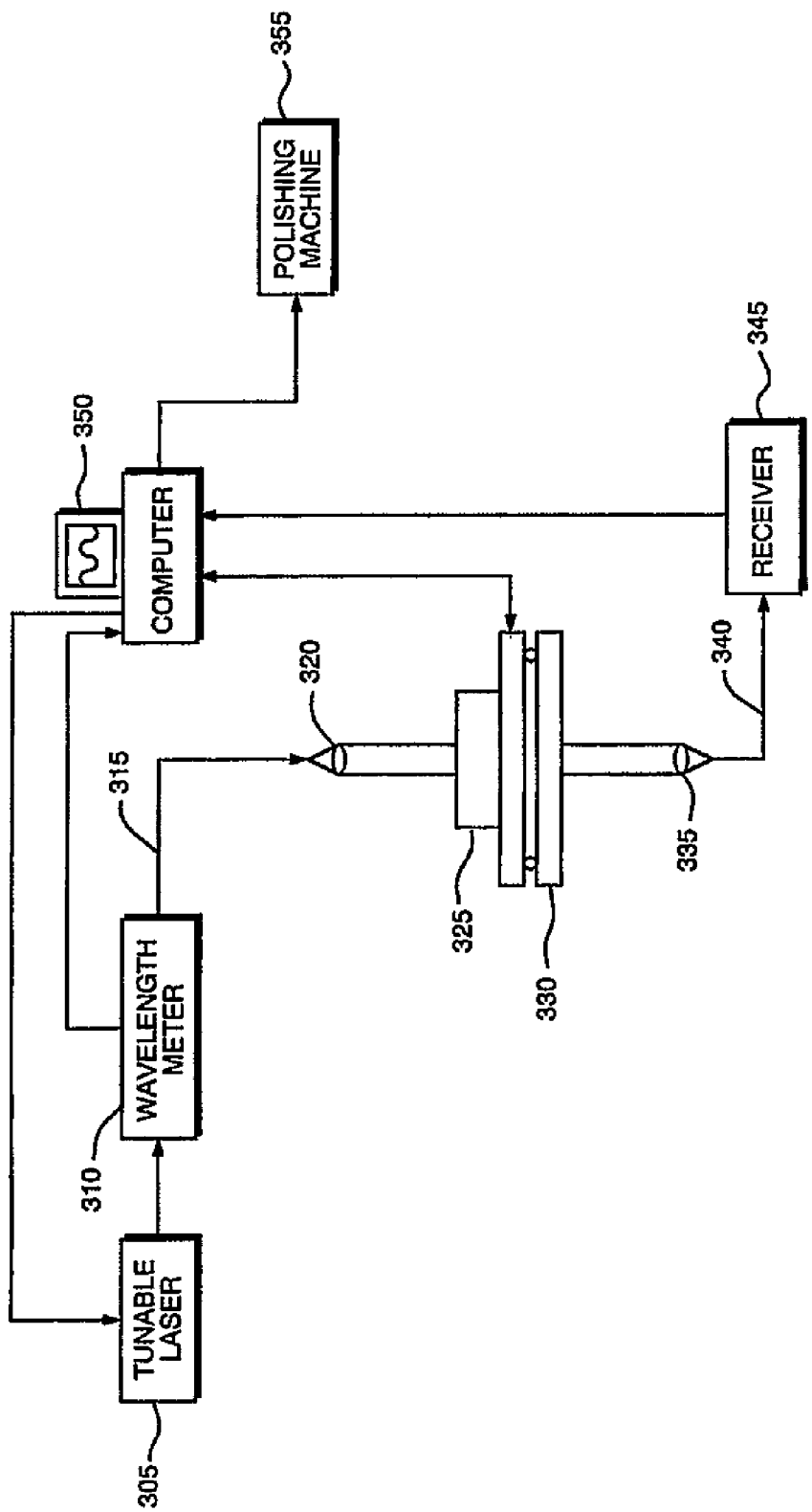

FIG. 6 is an exemplary depiction of a comparison of an expected waveform generated in accordance with the above and a waveform measured in the above described manner. FIG. 7 is an exemplary depiction of an error waveform generated in accordance with the above based on the comparison shown in FIG. 6.

Figure 5:
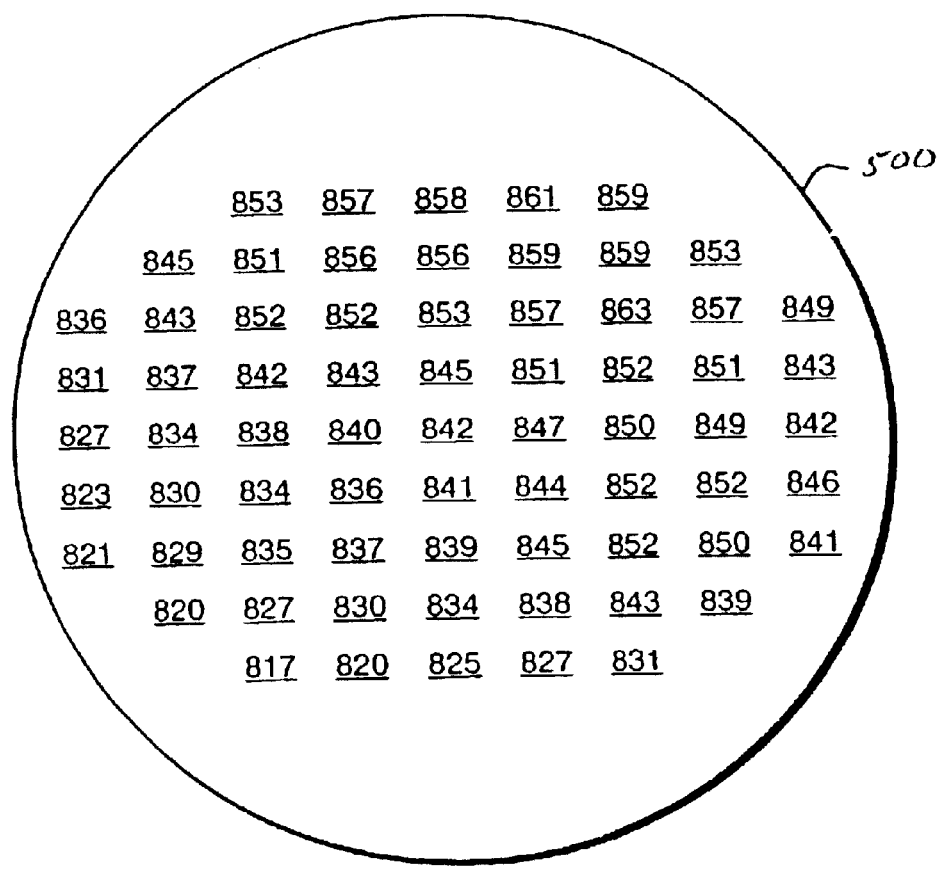
FIG. 5 depicts a mapping of apparent optical thicknesses generated by the computer of FIG. 3 in accordance with the present invention.

The OPD or apparent thickness at each of the points of interest can be mapped in a display, such as the contour map shown in FIG. 5, or otherwise presented to the operator. Mapping the OPD or apparent thicknesses using different colors to represent different OPDs or thicknesses and/or providing section cut mappings may be particularly beneficial to the user. As shown in FIG. 5, the apparent thicknesses vary from 817 microns to 861 microns. It will be understood that, although the refractive index could potentially vary from one point to another in the optical component, the computed apparent thickness at each point accurately reflects the actual OPD. Hence, any variation in the index, is reflected in the computed optical thickness or OPD at each point.

The computer 350 also computes the differences in the computed OPDs or apparent thicknesses across the entire optical component 325. The computer 350 additionally determines the minimum and maximum OPDs or thicknesses, and computes a numerical value for the peek difference between the minimum and maximum values.

Thus, based on the outputs of the receiver 345 and X-Y stage 330, the computer 350 generates information accurately reflecting and mapping any non-uniformity in the characteristic, and more particularly the OPD, of the optical component.

It should be understood that, although the wavelength is preferably modulated as described above to vary the intensity output from the receiver at each point of interest on the optical component, other parameters of the emitted beam could also or alternatively be varied with the same or a similar effect. For example, if a non-tunable laser were used, resulting in the wavelength remaining fixed, the angle of incidence could be varied to vary the intensity of the light passing through the optical component at the point of interest and received by the receiver.

In such a case, it will be understood that no waveforms would be acquired by the receiver and accordingly no expected waveforms would need to be generated by the computer and compared with measured waveforms. Rather, the variation in the incident angle of the beam by predetermined amounts will cause the constant wavelength beam to be steered some amount based on the thickness of the material. A receiver capable of measuring small deviations could be used to detect the passing light and acquire data corresponding to the amount of steerage. As will be understood by those skilled in the art, the computer could also be configured to compute, expected steerage amounts over the range of thicknesses described above and to compare the expected and measured amounts to determine the apparent thickness or OPD at each point of interest on the optical component.

In the event, notwithstanding how the apparent thickness or OPD at each point of interest on the optical component 325 is determined by the computer 350, the areas which have a greater apparent thickness or OPD than the other areas of the optical component 325 can be identified based on the data generated for each of the points of interest. For example, an operator could visually review the contour map, such as the mapping shown in FIG. 5, to determine those areas which may require polishing to decrease the apparent thickness and OPD which have a greater apparent thickness or OPD than the other areas of the optical component 325. However, preferably the mapping is used only as a visual aid for the operator, and the computer 350, operating in accordance with its stored logic, outputs a file of digital data, which corresponds to the computed OPDs or apparent thicknesses, and the associated point location coordinates for the points of interest across the entire optical component 325, to the automated polishing machine 355.

More particularly, the computed apparent thickness or OPD data, such as that represented in the FIG. 5 mapping, is transformed by the computer 350, in accordance with its stored logic, into data usable by the polishing machine 355. In this regard, the data associated with each point of interest is transformed by normalizing the apparent thickness or OPD associated with each point of interest to the minimum apparent thickness or OPD for all the points of interest. To normalize the data, the computer 350 computes the difference between this minimum apparent thickness or OPD and the apparent thickness or OPD at each point of interest, thus generating a normalize data set at a value of 0.

The delta data-representing the difference between the minimum computed apparent thickness or OPD at all points of interest and the apparent thickness or OPD at the applicable point of interest, in association with the location coordinates for the applicable point-for all of the points of interest are then stored as a file in the memory 415 of computer 350. This stored file can be loaded on the automated polishing machine 355.

Thus, the computer 350 preferably generates both data representing the apparent thickness or OPD for each point of interest, as depicted in the contour map of FIG. 5, as a visual aid for the operator and normalized or delta data, representing the difference between the minimum apparent thickness or OPD for all the measured points and the apparent thickness or OPD for each point of interest, as an input to the automated polishing machine 355.

The file having the normalized data, i.e. the delta data, and associated point location coordinates for all the points may be stored by the computer 350 on a portable storage medium within the memory 415 of FIG. 4, such as a floppy disk or compact optical disk, and physically transported to the polishing machine for loading. Advantageously, the file is stored on a hard disk within the memory 415, and transmitted from the computer 350 to the automated polishing machine 355 via a communications link, which could be part of communications network, such as a local area network (LAN) or some other type of network, such as the Internet.

The user can input to the computer 350, via port 420A or 420B, a uniformity threshold within which no further polishing need be performed. That is, once the maximum difference between the minimum apparent optical thickness or OPD for all the points and the maximum apparent optical thickness or OPD for all the points is within the threshold, e.g. equal to or less than the threshold, polishing stops. For example, in a particular implementation the threshold may allow for a 1 nm maximum variation, while in another implementation a 3 nm maximum variation may be acceptable to meet the specification. Typically, the threshold for the particular implementation, e.g. the allowable variability in non-uniformity, will be shown on a job drawing furnished to the operator with the optical component. The threshold will commonly indicate the total thickness variation which can be tolerated for the job or what the job specification is for the total thickness variation. Once the variation in non-uniformity throughout the optical component is determined, based on the measured data, to be within the total thickness variation or specification on the job drawing, the operator ceases further polishing of the optical component, and the component moves to the next stage of fabrication. Hence, the threshold represents a pass or fail range.

The computer 350, in accordance with its programmed logic, computes and displays on the monitor 430, the maximum peek to valley distance or OPD value for the optical component based on the measured data. Thus, the operator can observe this displayed value to determine if the non-uniformity of the optical component is within or outside the threshold. That is, by viewing this single value on the monitor and the threshold indication on the job drawing, the operator can easily determine whether the maximum peek to valley value has been sufficiently reduced by the prior polishing to be within the acceptable range.

In a particularly advantageous implementation of the invention, the threshold itself is input to computer 350, and the computer, in accordance with its programmed logic, automatically compares the threshold with the maximum peak to valley value and displays a pass/fail indication on the monitor 430.

If the optical component is intended to be in the shape of a wedge or in some other more complex shape, the computer 350 will compute a maximum peak to valley value for each point or for each of multiple subsets of points. In such a case, the predefined threshold for each point or subset of points could be the same or variable. Here again, as previously described, the operator or computer will use the computed and threshold values to determine if the optical component passes, and therefore does not require further polishing, or fails, and therefore requires further polishing. It will be understood that the present invention is easily adaptable to polishing optical components having a complex shape, such as a wedge or spiral, using the measured data input to the computer 350 from the receiver 345.

The preferred polishing process performed by the polishing machine 355 is magnetorheological finishing (MRF), which has been commercialized by QED Technologies. The polishing process enables very localize polishing, sometimes referred to as sub-aperture polishing, when compared to more conventional polishing processes. However, ion beam polishing could alternatively be used in lieu of MRF polishing.

As discussed above, the computer 350 outputs instructions to the polishing machine 355 which direct where to remove material and how much to remove. It will be recognized that in order to properly polish the optical component, the optical component must be correspondingly registered at the X-Y stage and the polishing machine. Various known registration techniques can be used, as will be understood in the art.

In its present form, the polishing machine 355 must remove some material from all grid points identified by the output from the computer 350. Currently, the operator inputs a value representing the minimum amount of material to be removed directly to the polishing machine 355. However, the input could alternatively be provided to the computer 350 and furnished to the polishing machine 355 as part of the output received from the computer 350.

After the basic delta data, grid point coordinates and minimum amount value have been received by the polishing machine 355, the received data is processed to display the predicted results of the polishing and the polishing is performed to correct the non-uniformity of the optical component. The displayed predicted results indicate the predicted thickness variation in the optical component after the polishing machine 355 executes the polishing cycle.

In a particularly advantageous implementation, the predicted results of the polishing generated by the polishing machine 355 are transmitted from the polishing machine 355 to the computer 350. The computer, in accordance with its programmed logic, processing the received data representing the predicted results to determine whether or not to proceed with the polishing. If the determination is to proceed, the computer 350 issues a further control signal to the polishing machine 355 to initiate the polishing cycle. Thus, the computer 350 may be configured to perform an evaluation of the results predicted by the polishing machine 355 prior to the initiation of the polishing cycle.

For example, based on the processing of the predicted result data from the polishing machine 355, the computer 350 may determine that the minimum amount value should be either increased or decreased. Such an increase or decrease could, for example, be desired to achieve a certain style OPD and/or level of uniformity. If so, the computer 350 will transmit a further instruction to the polishing machine 355 not to proceed with the polishing and will also transmit a modified minimum amount value. The polishing machine 355 will then process the new minimum amount value with the previously submitted or resubmitted delta and location data to generate revised predicted results. The revised predicted results are transmitted to the computer 350 for further processing to determine whether or not to instruct the polishing machine 355 to initiate the polishing cycle.

In processing the data received from the computer 350, the polishing machine 355 automatically adjusts the delta data in view of the minimum amount value. In other words if the delta data for a particular point represents a normalized value of say 20 nanometers of material to be removed in order to have a uniform OPD or apparent thickness, and the minimum amount value is 10 nanometers of material to be removed, the polishing machine 355 adjusts the delta data so that 30 nanometers are removed at that point.

If desired, the grid pattern furnished to the polishing machine 355 by the computer 350 may be defined to be finer grid than the grid pattern used to control the movement of the X-Y stage. That is, the intensity of the laser light passing through the optical component may be measured at a first number of points by controlling movement of the X-Y stage based on a relatively coarse grid pattern, while the optical component may be polished at a second, much larger, number of points by controlling the polishing machine based on a relatively fine grid pattern. In such a case, the polishing machine or the computer, in accordance with its programmed logic, can interpolate the delta data associated with the coarser grid onto the points of the finer grid prior to either initiating polishing or, if the computer 350 performs the interpolation, outputting data from the computer 350 to the polishing machine 355. For example, if measurements are taken by controlling the X-Y stage 330 to move at 5 mm intervals, polishing may be performed at a much finer scale, such as every 1 mm, by appropriate control of the polishing machine 355.

Accordingly, the computer 350 may output a finer scale grid pattern identifying all of the points of interest and the nominal thickness of material to be removed, and the delta data indicating the difference between the minimum apparent thickness amongst all the points of a coarser scale grid pattern, and the apparent thickness of the each of the points identified in the coarser scale grid pattern to the polishing machine 355.

In such a case, the polishing machine 355 interpolates the delta data for the finer scale grid points. Alternatively, the computer 350 may output the finer scale grid pattern identifying all of the points of interest and the nominal thickness of material to be removed, and interpolated delta data indicating the difference between the minimum apparent thickness amongst all the points and the apparent thickness of the each of the points identified in the finer scale grid pattern to the polishing machine 355. In such a case, interpolation of the delta data by the polishing machine 355 is not required.

The polishing process is not perfectly deterministic. Rather, polishing and then re-measuring will typically be required. For various reasons, it is not uncommon for 4 or 5 iterations to be required before sufficient uniformity is achieve. For example, multiple iterations may be required because the optical component requires a substantial number of corrections, not all of which can be made in a single polishing cycle, and hence must be made progressively. Multiple iterations could also be required because of the lack of precision of the polishing machine 355, causing the amount of material removed to vary slightly from the amount which should have been removed in accordance with the delta data, grid coordinate data and minimum amount data received from the computer 350.

Figure 2:
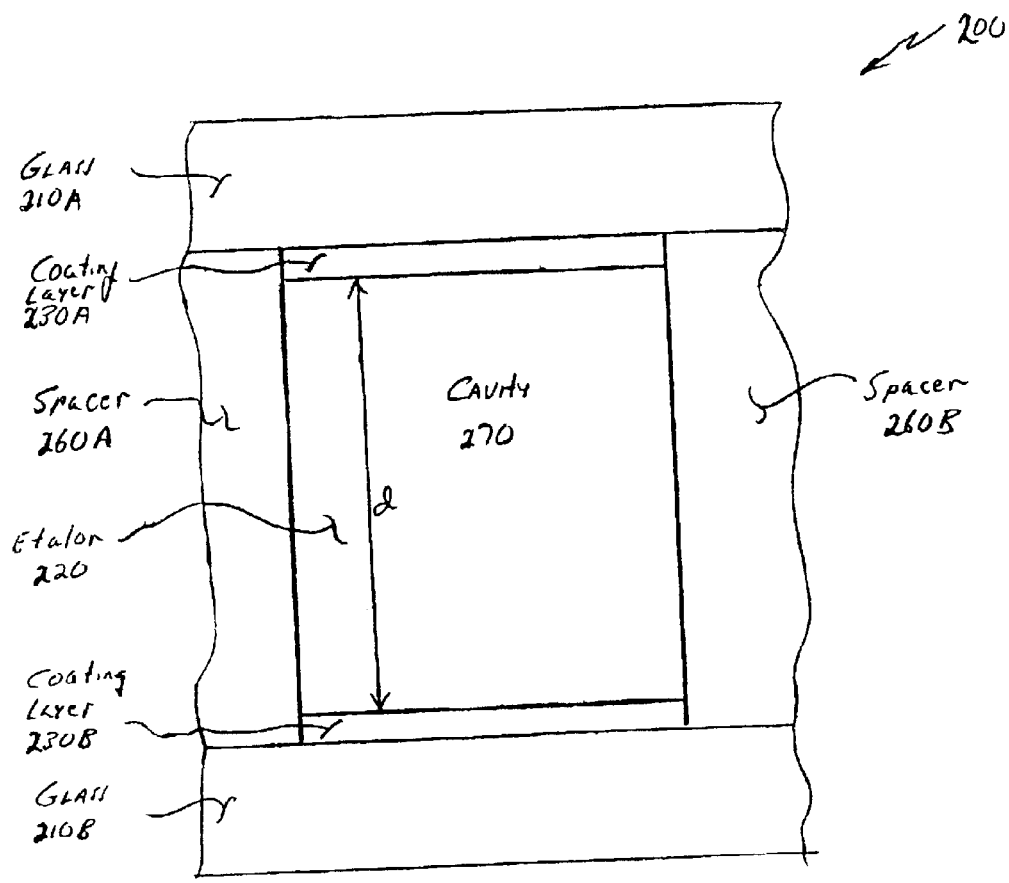
FIG. 2 depicts a conventional flat of optical devices.

It should be noted that the same technique can be used for coated optical components, such as glass plate 210A and coating 230A, or glass plate 210B and coating 230B, or the etalon 200, shown in FIG. 2. More particularly, variations in the apparent thickness or OPD caused by a coating which has been applied to the optical component or variations in the apparent thickness or OPD expected to be caused by a coating to be subsequently applied to the optical component, may be corrected using the above described technique.

For example, during the coating of optical components, a greater amount of the coating may persistently adhere to the edges of the component than to the center of the component. In such a case, measurements can be made in a manner similar to that described above, except that the expected waveforms must be computed for the coated optical component, which will require knowledge of the refractive index of both the optical component and the coating. The computer can then generate delta data, based on the data received from the receiver, which controls the polishing machine so as to remove coating, e.g. the built up coating at the edges, from the coated component.

Using a somewhat modified technique, the computer 350 can be configured, i.e. by its programmed logic, to process the measured data received from the receiver 345 to determine a relative change from point to point based on peak to peak relationships, without determining the actual difference. The computer 350 then identifies delta data based on the relative change data, which is used by the polishing machine to polish the coated optical component to modify the apparent thickness or OPD to be within the desired threshold.

It will be recognized that coatings are typically formed of multiple layers, not a single layer. Each layer may have a different thicknesses and/or be of a different material. Most often, a multi-layer dielectric coating is used. If the cause of the variation in the apparent optical thickness or OPD is one or more layers which are buried under other of the layers, there may be little opportunity to correct the error, particularly if the optical component is coated on both sides, since such a correction would require polishing through the top layers to get to the inner layers. However, if the coating is only applied to a single side of the optical component, the error may be correctable by removing material from or even adding material to the non-coated side of the optical component. Coated SiO2 may be used to increase the thickness of the uncoated side of the optical component if the component material is SiO2. If required, a coating can be applied to the previously uncoated side of the optical component after the error has been corrected.

On the other hand, in the case of optical components to be subsequently coated, a prediction can be made based on measurements of a coated optical component made in a manner similar to that described above. In this case, the computer computes the apparent thickness or OPD of the coated optical component based on the data received from the receiver. The computer then compares the computed apparent thickness or OPD for the coated optical component with that of this same optical component after polishing but prior to coating, to predict the expected change in the apparent optical thickness or OPD of other non-coated and yet to be polished optical components.

In order to have the apparent thickness or OPD for the coated optical component prior to coating available for comparison, the thickness or OPD data generated by the computer after the final polishing of the optical component, but prior to coating, is stored on the computer memory 415. The computer can then generate the delta data for the non-coated optical components to be subsequently polished based upon not only the measured data received for each of these components, but also the expected change in the apparent thickness or OPD when the coating is applied after polishing has been completed. Hence, the computer 350 can take into account the predicted optical characteristic change likely to be caused by the subsequent addition of a coating after the polishing of the optical component has been completed.

In a particularly preferred implementation, a sample optical component in the form of a wedge or having a radial thickness variation, rather than an optical component of uniform thickness, is used to predict the effect of adding the coating to the polished component. This provides a sample having a range of thicknesses and facilitates the determining of the effect of the coating on a number of different uniform optical components on an as needed basis, by simply selecting the portion of the coated optical component that has the appropriate thickness.

In the case of flats containing multiple optical components which are to be subsequently separated from the flat for use individually, the computer 350 can be further configured by its programmed logic to further control the X-Y stage and the laser to determine those of the individual optical components which, based on the processing of the measured and threshold data, are unacceptable, e.g. because they do not conform to a predefined specification, after the final polishing cycle. Those individual components which are unacceptable can then be marked, and discarded during the slicing process. The marking may be performed by hand, based on the computer 350 generating and displaying the grid coordinates of individual components in the flat which are determined to be unacceptable. To aid the operator in making the markings, the grid coordinates may be serialize.

However, beneficially, automated marking is performed. In this regard, the computer 350 generates further instructions, in accordance with its programmed logic, to control a laser to write a mark on each unacceptable component immediately after processing the measurement data and prior to directing a further movement of the X-Y stage to move the applicable grid point after the measurement has been taken. In the case of automated marking, the laser 305 could include a separate co-axial high power laser which operates in accordance with the write control instructions generated by the computer 350. The co-axial alignment of lasers is well understood in the art. Alternatively, the laser 305 could be a dual power laser, which are also well know in the art, capable of operating at the higher power to mark the unacceptable optical components in accordance with the write instructions from the computer 350.

As described herein, the present invention can be used, for example, to fabricate a glass plate with known variation in the apparent optical thickness or OPD. Using the fabricated plate, the variations in the optical performance or characteristics of a finished, i.e. coated, etalon plate can be mapped and the optical thickness needed to meet the specification can be determined. Etalon plates-whether for use in a solid, liquid, air or vacuum etalon-can be subsequently fabricated to the determined plate thickness. Variations in the optical thickness could, for example, relate to the plate having a wedge shape or having radial variations in its thickness, with the plate being thicker either in the center or at the edges. The shape of the variation may be spherical or aspherical.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. For example, the invention is easily adaptable for use in testing other optical characteristics after polishing or coating. Accordingly, the claims set

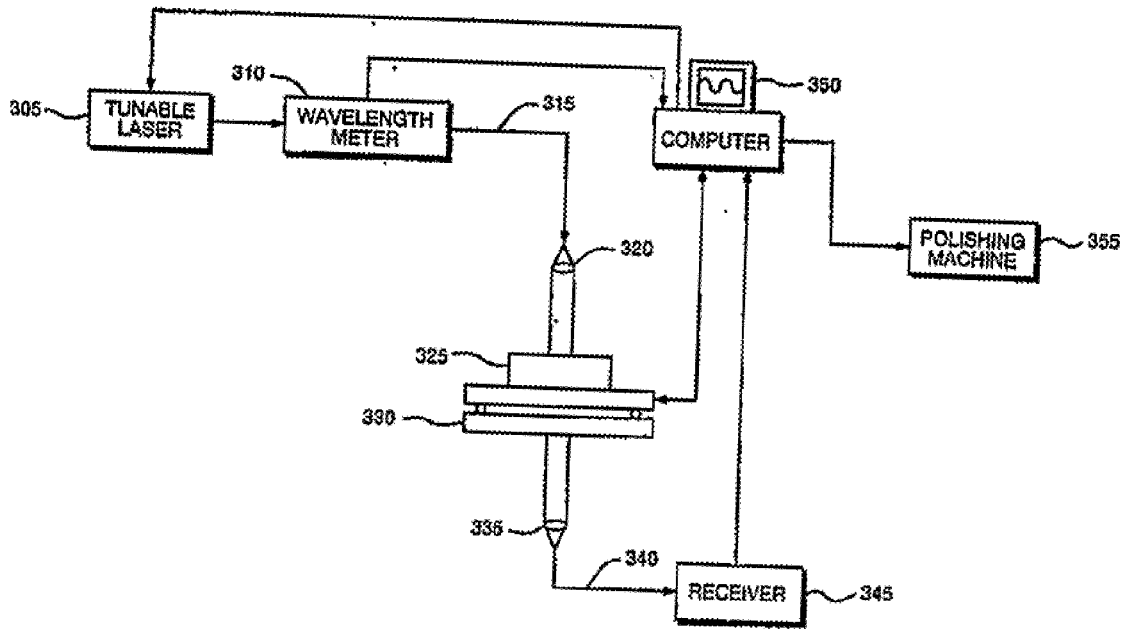

What is claimed is:

1. A method for determining the uniformity of an optical component, comprising:
   directing a light beam to impinge on a surface of an optical component at each of multiple points;
   modifying a characteristic of the light beam impinging on the optical component surface so that each of the multiple points is associated with a light beam that is distinct from the light beam at other points;
   detecting light from the impinging light beam that passes through the optical component at each of the multiple points; and
   determining a non-uniformity of the optical component based on the detected passing light.

2. The method of claim 1, wherein the light beam is directed along a fixed path, and prior to the directing, modifying, and detecting associated with any one point, the method further comprises:
   moving the optical component to align that any one point with the fixed path of the light beam.

3. The method of claim 1, wherein the modified light beam characteristic is one of a wavelength and an angle of incidence.

4. The method of claim 1, wherein:
   the multiple points are a pattern of points arranged in a grid with each of the pattern points in the grid being an equal distance from adjacent ones of the pattern points in the grid.

5. The method of claim 1, wherein:
   the non-uniformity of the optical component is determined by computing a characteristic of the optical component at each of the multiple points based on the detected passing light.

6. The method of claim 5, wherein:
   the optical component characteristic is one of an apparent optical thickness and an optical path distance (OPD).

7. The method of claim 1, further comprising:
   polishing the optical component based on the determined non-uniformity of the optical component.

8. The method of claim 7, wherein the non-uniformity of the optical component is determined by computing one of an apparent optical thickness and an optical path distance (OPD) of the optical component at each of the multiple points based on the detected passing light, and further comprising: normalizing the computed one of the apparent optical thickness and the optical path distance (OPD) of the optical component at each of the multiple points based on the detected passing light;
   wherein at least one of the impinge surface and another surface opposed to the impinge surface of the optical component at each of the multiple points is polished based on the normalized one of the apparent optical thickness and the optical path distance (OPD) at each of the multiple points.

9. The method of claim 7, further comprising:
   determining a maximum non-uniformity with respect to all of the multiple points;
      comparing the determined maximum non-uniformity with a threshold maximum non-uniformity value; and
   determining if polishing is required based on the comparison;
      wherein the optical component is polished only if it is determined that polishing is required.

10. The method of claim 9, further comprising:
    generating a pass indicator if it is determined that polishing is not required and a fail indicator if it is determined that polishing is required.

11. The method of claim 9, wherein:
    the non-uniformity of the optical component is determined by computing one of an apparent optical thickness and an optical path distance (OPD) of the optical component at each of the multiple points based on the detected passing light; and the maximum non-uniformity with respect to all of the multiple points is determined based on the maximum difference between the one of (i) the computed apparent optical thicknesses and (ii) the computed optical path distances (OPDs) of the optical component, at any two of the multiple points.

12. The method of claim 7, wherein:
    the optical component is includes another surface opposed to the impinge surface;
    one of the impinge surface and the other surface is a coated surface; and
    the polishing includes polishing the coated surface.

13. The method of claim 7, wherein:
    the optical component is includes another surface opposed to the impinge surface;
    one of the impinge surface and the other surface is a coated surface;
    the other of the impinge surface and the other surface is non-coated; and
    the polishing includes polishing the non-coated surface.

14. The method of claim 7, wherein:
    the multiple points at which the directed light beam impinges on the surface of the optical component form a pattern of impinge points arranged in a first grid with each of the impinge points in the first grid being a first distance from adjacent ones of the impinge points in the first grid;
    the optical component is includes another surface opposed to the impinge surface; and
    the polishing includes polishing one of the impinge surface and the other surface of the optical component at multiple polish points forming a pattern of polish points arranged in a second grid corresponding to the first grid, with each of the polish points in the second grid being a second distance from adjacent ones of the polish points in the second grid.

15. The method of claim 14, wherein:
    the first distance and the second distance are different.

16. The method of claim 7, wherein:
    the optical is polished so as to have a complex shape.

17. The method of claim 16, wherein:
    the complex shape is one of a wedge and spiral.

18. The method of claim 7, further comprising:
    generating a predicted result of the polishing based on the determined non-uniformity of the optical component;
    determining whether or not to proceed with the polishing based on the generated predicted result; and
    directing the polishing to proceed only if is determined to proceed with the polishing.

19. The method of claim 18, further comprising:
    identifying a first minimum thickness of the material to be removed by the polishing, wherein a first predicted result is generated based on the determined non-uniformity of the optical component and the identified first minimum thickness and wherein it is determined not to proceed with the polishing based on the generated first predicted result: and identifying a second minimum thickness of the material to he removed by the polishing, wherein a second predicted result is generated based on the determined non-uniformity of the optical component and the identified second minimum thickness and wherein it is determined to proceed with the polishing based on the generated second predicted result.

20. The method of claim 7, wherein:

the optical component is one of a plurality of optical components forming a fiat of optical components.

21. The method of claim 1, further comprising: adding material to the optical component based on the determined non-uniformity of the optical component.

22. The method of claim 1, further comprising:

generating a contour map of the optical component based on the determined non-uniformity.

23. The method of claim 22, wherein:

the non-uniformity of the optical component is determined by computing one of an apparent optical thickness and an optical path distance (OPD) of the optical component at each of the multiple points bused on the detected passing light: and the generated contour map represents the computed apparent optical thickness or the computed optical path distance (OPD) of the optical component at each of the multiple points.

24. The method of claim 1, wherein the optical component is one of a plurality of optical components forming a flat of optical components, and further comprising:

marking the optical component as unacceptable based on the determined non-uniformity; and slicing the flat to separate each of the plurality of optical components from other of the plurality of optical components.

25. The method of claim 1, wherein the optical component is an etalon.

26. The method of claim 1, wherein the optical component is a coated optical component, and further comprising:

directing a light beam to impinge on a surface of a non-coated optical component at each of multiple points;

modifying a characteristic of the light beam impinging the non-coated optical component surface so that each of the multiple points is associated with a light beam that is distinct from the light beam at other points;

detecting light from the impinging light beam that passes through the non-coated optical component at each of the multiple points;

determining a non-uniformity of the non-coated optical component based on the detected passing light;

polishing the non-coated optical component based on the determined non-uniformity of the non-coated optical component and the determined non-uniformity of the coated optical component; and coating the polished non-coated optical component.

27. A system for determining the uniformity of an optical component having opposed primary surfaces, comprising:

a laser light beam emitter configured to emit a light beam to impinge on one of the primary surfaces of the optical component at each of multiple points, and to modify a characteristic of the light beam impinging the one primary surface of the optical component so that each of the multiple points is associated with a light beam that is distinct from the light beam at other points;

a detector configured to detect light from the impinging light beam that passes through the other primary surface of optical component at each of the multiple points; and a processor configured to determine a non-uniformity of the optical component based on the detected passing light.

28. The system of claim 27, wherein the emitted light beam is directed along a path, and the processor is further configured to generate emitter control signals to control the emission of the light beam by the laser light beam emitter and alignment control signals to align each of the multiple points with the path of the emitted light beam prior to the light beam being emitted to impinge on the optical component at that point, and further comprising:

a stage configured to support the optical component and to move the optical component in accordance with the generated alignment control signals.

29. The method of claim 27, wherein:

the laser light beam emitter includes a tunable laser;

the modified light beam characteristic is a-wavelength; and the processor is further configured generate control signals to modify the wavelength of the emitted light beam impinging on the one primary surface of the optical component at each of the multiple points, such that the impinging light beam at each point has multiple different wavelength values.

30. The system of claim 27, wherein:

the processor is further configured to determine the non-uniformity of the optical component by computing a characteristic of the optical component at each of the multiple points based on the detected passing light.

31. The system of claim 27, wherein the processor is further configured to generate control signals based on the determined non-uniformity of the optical component, and further comprising:

a polisher configured to remove material from the optical component based on the generated control signals.

32. The system of claim 31, wherein:

the processor is further configured to determine the non-uniformity of the optical component by computing one of an apparent optical thickness and an optical path distance (OPD) of the optical component at each of the multiple points based on the detected passing light, to normalize the computed one of the apparent optical thickness and the optical path distance (OPD) of the optical component at each of the multiple points based on the detected passing light, and to generate the control signals based on the normalized one of the apparent optical thickness and the optical path distance (OPD) at each of the multiple points; and the polisher is further configured to remove material from at least one of the primary surfaces of the optical component at each of the multiple points based on the generated control signals.

33. The system of claim 31, wherein:

the processor is further configured to determine a maximum non-uniformity of the optical component with respect to all of the multiple points, to compare the determined maximum non-uniformity with a threshold maximum non-uniformity value, to determine if polishing is required based on the comparison and to generate the control signals only if it is determined that polishing is required.

34. The system of claim 33, wherein:

the processor is further configured to generate a pass indicator if it is determined that polishing is not required and a fail indicator if it is determined that polishing is required.

35. The system of claim 33, wherein:

the processor is further configured to determine the non-uniformity of the optical component by computing one of an apparent optical thickness and an optical path distance (OPD) of the optical component at each of the multiple points based on the detected passing light, and to determine the maximum non-uniformity with respect to all of the multiple points based on the maximum difference between the computed one of the apparent optical thicknesses and the optical path distances (OPDs) of the optical component, at any two of the multiple points.

36. The system of claim 31, wherein the emitted light beam is directed along a path, and the processor is further configured to generate emitter control signals to control the emission of the light beam by the laser light beam emitter, alignment control signals to align each of the multiple points with the path of the emitted light beam prior to the light beam being emitted to impinge on the optical component at that point, and polish control signals based on the determined non-uniformity of the optical component and further comprising:

a stage configured to support the optical component and to move the optical component in accordance with the generated alignment control signals, such that the multiple points, at which the emitted light beam impinges on the one primary surface of the optical component, form a pattern of impinge points arranged in a first grid with each of the impinge points in the first grid being a first distance from adjacent ones of the impinge points in the first grid; and a polisher configured to remove material from the optical component based on the generated polish control signals, such that the polisher removes material from at least one of the primary surfaces of the optical component at multiple polish points forming a pattern of polish points arranged in a second grid corresponding to the first grid, with each of the polish points in the second grid being a second distance from adjacent ones of the polish points in the second grid.

37. The system of claim 31, wherein:

the polisher is further configured to generate a predicted result of the material removal based on the polish control signals;

the processor is further configured to determine whether or not to proceed with the material removal based on the generated predicted result, and to direct the polisher to remove material from the optical component only if it is determined to proceed.

38. The system of claim 37, further comprising:

a user input device for entering a first minimum thickness of the material to be removed by the polisher;

wherein the polisher is further configured to generate a first predicted result based on the determined non-uniformity of the optical component and the entered first minimum thickness;

wherein the processor is further configured to determine not to proceed with the removal of material based on the generated first predicted result; and wherein the user input device is further configured to enter a second minimum thickness of the material to be removed by the polisher;

wherein the polisher is further configured to generate a second predicted result based on the determined non-uniformity of the optical component and the identified second minimum thickness;

wherein the processor is further configured to determine to proceed with the material removal based on the generated second predicted result.

39. The system of claim 27, wherein:

the processor is further configured to generate a contour map of the optical component based on the determined non-uniformity.

40. The system of claim 39, wherein:

the processor is further configured to determine the non-uniformity of the optical component by computing one of an apparent optical thickness and an optical path distance (OPD) of the optical component at each of the multiple points based on the passing light detected by the detector: and the generated contour map represents the computed one of the apparent optical thickness and the optical path distance (OPD) of the optical component at each of the multiple points.

41. The system of claim 27, wherein the optical component is a coated optical component, and further comprising:

a non-coated optical component having opposed primary surfaces: and a polisher configured to remove material from a non-coated optical component;

wherein the laser light beam emitter is further configured to emit a light beam to impinge on one of the primary surfaces of the non-coated optical component at each of multiple points, and to modify a characteristic of the light beam impinging on the one primary surface of the non-coated optical component so that each of the multiple points is associated with light beam that is distinct from the light beam at other points;

wherein the detector is further configured to detect light from the impinging light beam that passes through the other primary surface of non-coated optical component at each of the multiple point;

wherein the processor is further configured to determine a non-uniformity of the non-coated optical component based on the detected passing light, and to generate control signals based on the determined non-uniformity of the non-coated optical component and the determined non-uniformity of the coated optical component;

wherein the polisher is further configured to remove material from the non-coated optical component based on the generated control signals.

* * * * *

UNITED STATES PATENT AND TRADEMARK OFFICE
CERTIFICATE OF CORRECTION

PATENT NO.         : 6,819,438 B2                                                                Page 1 of 9
APPLICATION NO. : 10/137662
DATED              : November 16, 2004
INVENTOR(S)        : Richard A. Neily, William McCreath and David Parker It is certified that error appears in the above-identified patent and that said Letters Patent is hereby corrected as shown below:

Title page should be deleted and substitute therefor the attached title page.

Delete Figs 1-7 - Insert following drawing sheets 1-7 as shown on the attached pages.

Column 12,
Line 64, delete "peek", insert --peak--

Column 14,
Line 45 and Line 51, delete "peek", insert --peak--

Column 21,
Line 13, delete "fiat", insert --flat--
Line 24, delete "bused", insert --based--

Signed and Sealed this

Twelfth Day of December, 2006

JON W. DUDAS
*Director of the United States Patent and Trademark Office*

(12) United States Patent
Neily et al.

(10) Patent No.: US 6,819,438 B2
(45) Date of Patent: *Nov. 16, 2004

(54) TECHNIQUE FOR FABRICATING HIGH QUALITY OPTICAL COMPONENTS

(75) Inventors: Richard A. Neily, Kars (CA); William McCreath, Stittsville (CA); David Parker, Morewood (CA)

(73) Assignee: GSI Lumonics Corporation, Billerica, MA (US)

(*) Notice: Subject to any disclaimer, the term of this patent is extended or adjusted under 35 U.S.C. 154(b) by 208 days.

This patent is subject to a terminal disclaimer.

(21) Appl. No.: 10/137,662

(22) Filed: May 3, 2002

(65) Prior Publication Data
US 2002/0176098 A1 Nov. 28, 2002

Related U.S. Application Data

(63) Continuation-in-part of application No. 09/872,303, filed on Jun. 1, 2001, now Pat. No. 6,639,682.
(60) Provisional application No. 60/208,863, filed on Jun. 2, 2000.

(51) Int. Cl.$^7$ .................................. G01B 11/06
(52) U.S. Cl. ........................... 356/632; 356/485
(58) Field of Search ............ 356/237.1, 237.2–237.5, 356/485, 503–505, 630–632, 429–430; 250/559.27

(56) References Cited

U.S. PATENT DOCUMENTS

| | | |
|---|---|---|
| 5,327,220 A | 7/1994 | Erickson |
| 5,528,370 A | 6/1996 | Tracy et al. |
| 5,620,357 A | 4/1997 | Misaka et al. |
| 5,671,050 A | 9/1997 | de Groot |
| 5,724,137 A | 3/1998 | Tronolone et al. |
| 5,751,427 A | 5/1998 | de Groot |
| 5,923,425 A | 7/1999 | Dewa et al. |
| 6,048,742 A | 4/2000 | Weyburne et al. |
| 6,198,293 B1 | 3/2001 | Woskov et al. |
| 6,639,682 B2 * | 10/2003 | Neily et al. ............ 356/504 |

* cited by examiner

Primary Examiner—Richard A. Rosenberger
Assistant Examiner—Vincent P. Barth
(74) Attorney, Agent, or Firm—Maine & Asmus

(57) ABSTRACT

To determine the uniformity of an optical component, a light beam is directed to impinge on a surface of an optical component at each of multiple points. A characteristic of the light beam impinging on the optical component surface at each of the multiple points is modified so as to have multiple different values. Light from the impinging light beam that passes through the optical component at each of the multiple points, with the light beam characteristic at each of the multiple different values, is detected. The non-uniformity of the optical component is determined based on the detected passing light.

41 Claims, 7 Drawing Sheets